(12) United States Patent
Rockett et al.

(10) Patent No.: US 10,255,242 B2
(45) Date of Patent: Apr. 9, 2019

(54) COMMUNICATIONS PLATFORM FOR IMPLEMENTING A RECOGNITION AND REWARD SYSTEM

(71) Applicant: RedCritter Corp., Flower Mound, TX (US)

(72) Inventors: James L. Rockett, Carrollton, TX (US); Robert M. Beaty, Flower Mound, TX (US); David R. Jenness, Flower Mound, TX (US); Randy M. Whelan, Coppell, TX (US)

(73) Assignee: RedCritter Corp., Flower Mound, TX (US)

( * ) Notice: Subject to any disclaimer, the term of this patent is extended or adjusted under 35 U.S.C. 154(b) by 216 days.

(21) Appl. No.: 15/197,519

(22) Filed: Jun. 29, 2016

(65) Prior Publication Data

US 2018/0005538 A1 Jan. 4, 2018

(51) Int. Cl.
*G06F 16/26* (2019.01)
*G09B 5/12* (2006.01)
*G06Q 50/20* (2012.01)
*H04L 29/08* (2006.01)
*G06F 16/951* (2019.01)
*G06F 16/955* (2019.01)

(52) U.S. Cl.
CPC ............ *G06F 16/26* (2019.01); *G06F 16/951* (2019.01); *G06F 16/9566* (2019.01); *G06Q 50/20* (2013.01); *G09B 5/12* (2013.01); *H04L 67/02* (2013.01); *H04L 67/10* (2013.01); *H04L 67/1095* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2003/0134261 A1* | 7/2003 | Jennen | ...... | G09B 7/00 434/354 |
| 2009/0287738 A1* | 11/2009 | Colbran | ...... | G06Q 50/20 |
| 2010/0262459 A1* | 10/2010 | Akian | ...... | G06Q 10/06 705/7.38 |
| 2014/0272847 A1* | 9/2014 | Grimes | ...... | G09B 19/00 434/236 |
| 2014/0356845 A1* | 12/2014 | Huber | ...... | G09B 5/08 434/362 |
| 2015/0079576 A1* | 3/2015 | Obae | ...... | G09B 7/00 434/350 |
| 2015/0125843 A1* | 5/2015 | Mayumi | ...... | G09B 5/00 434/350 |

(Continued)

*Primary Examiner* — Jason T Yen
(74) *Attorney, Agent, or Firm* — Kirton McConkie; Brian Tucker

(57) ABSTRACT

A communications platform is provided which can be employed to implement a recognition and reward system that is simple to use, streamlined, and scalable thereby enabling such systems to be seamlessly implemented in many different environments. The communications platform can be implemented in a client-server environment in which a server or servers maintain a number of data structures which can be employed to facilitate the creation and display of a dashboard representing achievements that have been awarded to students, to facilitate the implementation of group competitions, and to facilitate the association of traits with students based on achievements that have been awarded to the students.

18 Claims, 33 Drawing Sheets

(56) References Cited

U.S. PATENT DOCUMENTS

| | | | |
|---|---|---|---|
| 2016/0063656 A1* | 3/2016 | Vattikonda | G06Q 50/205 705/326 |
| 2016/0105328 A1* | 4/2016 | Cooper | G06F 3/0484 715/736 |
| 2016/0170689 A1* | 6/2016 | Sprague | G06F 3/1207 358/1.15 |
| 2017/0078362 A1* | 3/2017 | Schneider | H04L 67/02 |

* cited by examiner

Student Table 301

| UserID | FirstName | LastName | ... |
|---|---|---|---|
| Student01 | Alyssa | Mayer | ... |
| Student02 | Brian | McGavin | ... |
| Student03 | Cecila | Cardenas | ... |
| Student04 | Lucy | Wooten | ... |
| ... | | | |

Teacher Table 302

| UserID | FirstName | LastName | ... |
|---|---|---|---|
| Teacher01 | Keith | Hunt | ... |
| Teacher02 | Greg | Mowery | ... |
| ... | | | |

Class Table 303

| ClassID | TeacherID | ClassName | ... |
|---|---|---|---|
| Class01 | Teacher01 | English | ... |
| Class02 | Teacher02 | Science | ... |
| ... | | | |

Student/Class Table 304

| ClassID | UserID | FirstName | LastName | Man_Email1 | Man_Email2 | Man_Email3 | Points | ... |
|---|---|---|---|---|---|---|---|---|
| Class01 | Student01 | Alyssa | Mayer | mom@email.com | null | null | 5 | ... |
| Class01 | Student02 | Brian | McGavin | mom@dom.com | dad@dom.com | aunt@dom.com | 25 | ... |
| Class01 | Student03 | Cecila | Cardenas | bro@mail.com | null | null | 25 | ... |
| Class02 | Student01 | Alyssa | Mayer | mom@email.com | dad@email.com | null | 45 | ... |
| ... | | | | | | | | |

*FIG. 3A*

Awarded Badges Table 305

| UserID | ClassID | BadgeID |
|---|---|---|
| Student01 | Class01 | Badge01 |
| Student01 | Class01 | Badge02 |
| Student03 | Class01 | Badge01 |
| Student01 | Class02 | Badge01 |
| ... | | |

Awarded Certifications Table 306

| UserID | ClassID | CertID |
|---|---|---|
| Student01 | Class01 | Cert01 |
| Student02 | Class01 | Cert01 |
| Student03 | Class01 | Cert02 |
| Student01 | Class02 | Cert03 |
| ... | | |

Awarded Rewards Table 307

| UserID | ClassID | RewardID |
|---|---|---|
| Student01 | Class01 | Reward01 |
| Student03 | Class01 | Reward01 |
| ... | | |

Awarded Actions Table 308

| UserID | ClassID | ActionName | Points |
|---|---|---|---|
| Student01 | Class01 | Initiative | 5 |
| Student03 | Class01 | Initiative | 15 |
| ... | | | |

Awarded Skills Table 309

| UserID | ClassID | SkillID | Points | CurrentLevel | NextLevel | Next_Lvl_Pnts |
|---|---|---|---|---|---|---|
| Student01 | Class01 | Skill01 | 4 | 1 | 2 | 10 |
| Student02 | Class01 | Skill01 | 12 | 2 | 3 | 20 |
| Student03 | Class01 | Skill01 | 8 | 1 | 2 | 10 |
| Student01 | Class02 | Skill02 | 21 | 3 | 4 | 30 |
| ... | | | | | | |

*FIG. 3B*

Communications Header Table 310

| ClassID | CommID | Date | ItemID | Message | Points | Allow_Feedback | ... |
|---|---|---|---|---|---|---|---|
| Class01 | Comm01 | 6/8/2016 | Initiative | Complete ... | 5 | Yes | ... |
| Class01 | Comm02 | 6/9/2016 | Badge01 | Review ... | null | No | ... |
| Class02 | Comm03 | 6/9/2016 | Initiative | Do ... | 10 | Yes | ... |
| ... | | | | | | | |

Communications Table 311

| ClassID | UserID | CommID | Status | Man_Email1 | Comment_Email1 | Man_Email2 | Comment_Email2 | ... |
|---|---|---|---|---|---|---|---|---|
| Class01 | Student01 | Comm01 | Completed | mom@email.com | Alyssa loved it! | null | null | ... |
| Class01 | Student02 | Comm01 | Pending | mom@dom.com | null | null | null | ... |
| Class01 | Student03 | Comm02 | Completed | bro@mail.com | null | null | null | ... |
| Class02 | Student01 | Comm03 | Incomplete | teach1@site.com | null | null | null | ... |
| ... | | | | | | | | |

From: ...
To: mom@email.com
Subject: English Daily Achievement for Alyssa

Daily Achievement                    June 8

Hello! I've created a Daily Achievement for Alyssa Mayer. Please let us know if Alyssa completes the task belwo today by clicking 'Yes' or "No.'

510a

Complete the worksheet I sent home with Alyssa.

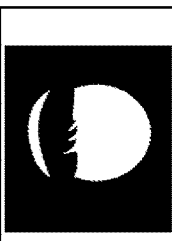

Yes   No

   If Alyssa completes this today, let us know so we can issue five Initiative action points.

Five Initiative
Action Points

*FIG. 6A*

| Class Table 303 | | |
|---|---|---|
| ClassID | TeacherID | ClassName |
| Class01 | Teacher01 | English |
| Class02 | Teacher02 | Science |
| Comp01 | ... | 3rd Grade |
| ... | | |

| Awarded Badges Table 305 | | |
|---|---|---|
| UserID | ClassID | BadgeID |
| Student01 | Group01 | Badge10 |
| Student02 | Group01 | Badge10 |
| Student03 | Group01 | Badge11 |
| Student04 | Group01 | Badge11 |
| ... | ... | ... |

| Student/Class Table 304 | | | | |
|---|---|---|---|---|
| ClassID | UserID | FirstName | LastName | ... |
| Comp01 | Student01 | Alyssa | Mayer | ... |
| Comp01 | Student02 | Brian | McGavin | ... |
| Comp01 | Student03 | Cecilia | Cardenas | ... |
| Comp01 | Student04 | Eli | Worthington | ... |

*FIG. 12*

| Badges Table 1501a | |  |
|---|---|---|
| BadgeID | BadgeName |  |
| Badge01 | Another Go | ... |
| Badge02 | Great Job | ... |
| Badge03 | Challenge Accepted | ... |
| Badge04 | Hard Work | ... |
| ... | | |

| Badge Traits Table 1501b | | | |
|---|---|---|---|
| BadgeID | Trait | Adjustment | |
| Badge01 | Coachability | 1 | ... |
| Badge01 | Grit | 1 | ... |
| Badge02 | Effectiveness | 1 | ... |
| Badge02 | Enthusiasm | 2 | ... |
| Badge03 | Boldness | 1 | ... |
| Badge03 | Enthusiasm | 1 | ... |
| Badge04 | Grit | 1 | ... |
| ... | | | |

*FIG. 15*

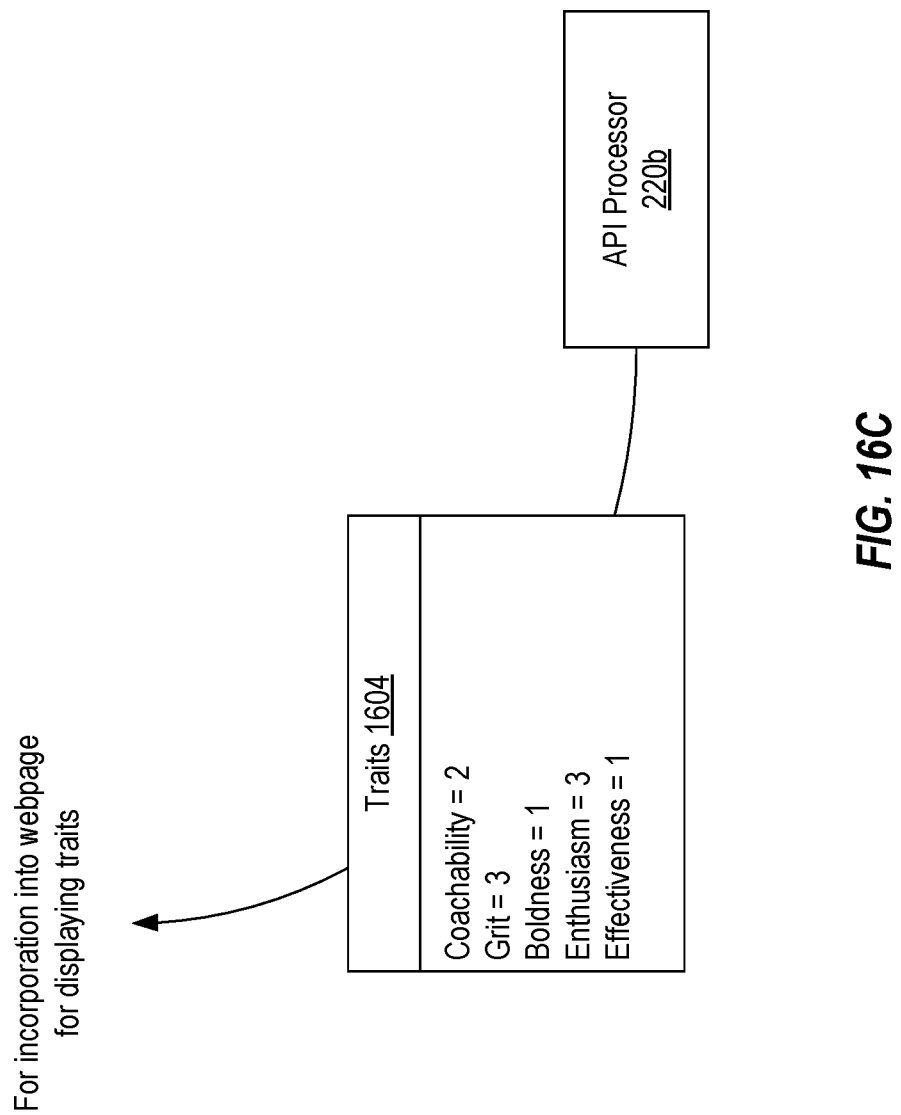

COMMUNICATIONS PLATFORM FOR IMPLEMENTING A RECOGNITION AND REWARD SYSTEM

CROSS-REFERENCE TO RELATED APPLICATIONS

N/A

BACKGROUND

The present invention is generally directed to a communications platform that can be employed to implement a recognition and reward system within a school, workplace, or other environment. More particularly, the present invention is directed to a communications platform that can facilitate the implementation of an efficient and scalable recognition and reward system in many different environments.

One problem faced by many educators, employers, managers, etc. is developing systems for challenging their students, employees, associates, etc. to improve their skills and abilities. It is known that recognition and reward systems provide a good incentive for such individuals to strive to improve themselves within their respective environments. However, the implementation of such systems can be difficult, time consuming, and not easily scaled. For example, in a school environment, the success of a recognition and reward system is dependent on parental involvement, but it is difficult to establish and maintain the necessary communications to involve the parents. Similar problems exist in the workplace where it is important that an employee's immediate supervisor be involved in managing the employee's involvement in the recognition and reward system.

Various recognition and reward systems exist in the prior art. However, many of these systems are limited to a particular environment or are dependent on specialized and complex end-user computing configurations. Such systems are therefore limited in their scalability and are oftentimes difficult to use. For these reasons, the users, including teachers and students or managers and employees alike, are less inclined to participate in a recognition and reward program. In short, for a reward and recognition system to be successful, it must provide a simple and streamlined experience to all end-users.

BRIEF SUMMARY

The present invention extends to a communications platform which can be employed to implement a recognition and reward system that is simple to use, streamlined, and scalable thereby enabling such systems to be seamlessly implemented in many different environments. The communications platform can be implemented in a client-server environment in which a server or servers maintain a number of data structures which can be used to define students, classes, a particular student's membership in a class, achievements that have been awarded to particular students in particular classes, traits associated with the achievements, and possibly many other characteristics. A number of back-end processes, websites, and web APIs can be configured to allow users to access the content of these data structures as well as to create new entries in these data structures to thereby facilitate the implementation of a rewards and recognition program.

In some embodiments, the communications platform can be employed to facilitate the creation and display of a dashboard which represents achievements that have been awarded within a particular organization such as school or workplace. For example, in such embodiments, the communications platform can comprise at least one server that implements one or more databases that define a number of data structures including: a student/class data structure which stores entries each of which defines a particular class to which a particular student belongs as well as at least one communication address for the particular student; and one or more achievement data structures, each achievement data structure storing entries defining achievements that have been awarded to a particular student in a particular class. The at least one server may also implement an API processor configured to receive communications that each identify an award of an achievement to a particular student in a particular class; and in response to receiving each communication, create an entry in the one or more achievement data structures to define the award of the achievement to the particular student in the particular class. The at least one server may also implement a dashboard website and web API that are configured to query the one or more achievement data structures to retrieve and display award information pertaining to a particular organization.

In other embodiments, the communications platform can be employed to facilitate the implementation of group competitions. For example, in such embodiments, the communications platform can comprise at least one server that implements one or more databases that define a number of data structures including: a classes data structure which stores a first set of entries each of which defines a group competition; a student/class data structure which stores a first set of entries each of which defines a particular group competition to which a particular student belongs; an achievement data structure which stores a first set of entries each of which defines an achievement that has been awarded to a particular student who belongs to a particular group competition, the achievement representing a particular group within the particular group competition; and a webhook data structure which stores entries each of which defines an association between a particular class identifier and a payload URL of a webhook. The at least one server can also include a webhook sender process configured to: detect when an entry has been added to the achievement data structure or one or more other achievement data structures, the entry defining that an achievement has been awarded to a particular student in a particular class; in response to detecting that an entry has been added, employ a class identifier associated with the detected entry to query the webhook data structure for any entry that includes the class identifier; and upon identifying an entry in the webhook data structure that includes the class identifier, send a payload that identifies the achievement of the detected entry to the associated payload URL. The at least one server can also include a group website that is configured to generate a group competition dashboard based on payloads received from the webhook sender process.

In other embodiments, the communications platform can be employed to generate and track traits of a student based on achievements that have been awarded to the student. For example, in such embodiments, the communications platform can comprise at least one server that includes one or more databases that define a number of data structures including: one or more first achievement data structures which store entries defining achievements including one or more traits associated with at least some of the achievements; and an awarded achievements data structure which stores entries which each define an achievement that has been awarded to a particular student in a particular class. The at least one server may also include a website and web API which are configured to generate requests to view a particular student's profile including the particular student's traits. The at least one server may further include an API processor that, in response to receiving a request to view a particular student's traits in a particular class, queries the awarded achievements data structure to identify each entry that defines an achievement that has been awarded to the particular student in the particular class, and for each identified entry, queries the one or more first achievement data structures to obtain any traits associated with the corresponding achievement, generates a trait value for each obtained trait and sends the trait value to the website for display.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3C illustrate a number of example data structures that can be employed to implement the communications platform in an efficient manner;

FIGS. 6A and 6B illustrate an example challenge email and challenge webpage respectively that can be presented to a parent or guardian when a teacher issues a challenge to a student;

FIG. 12 illustrates an example of how a group competition can be defined within the communications platform;

FIG. 15 illustrates an example of how traits can be associated with achievements;

FIGS. 16A-16C illustrate an example of a process by which the communications platform can dynamically calculate a student's traits and trait values based on achievements that have been awarded to the student.

DETAILED DESCRIPTION

In the following description, the communications platform of the present invention will primarily be described with reference to an embodiment in which the communications platform is employed to implement a recognition and reward system in a school environment. However, the present invention should not be limited to use in any particular environment. For example, the communications platform could equally (and concurrently) be employed in a workplace environment.

Because the present invention will be described in the context of a school environment, the term "student" as used in the description should be construed broadly as encompassing any individual that belongs to a group that is overseen by another individual. The term "teacher" should be construed as an individual that oversees such a group. The terms "parent" and "guardian" should be construed as an individual that is typically not the teacher of a student's group but otherwise plays a parenting or managerial role in the student's involvement in the group.

Figure 1:
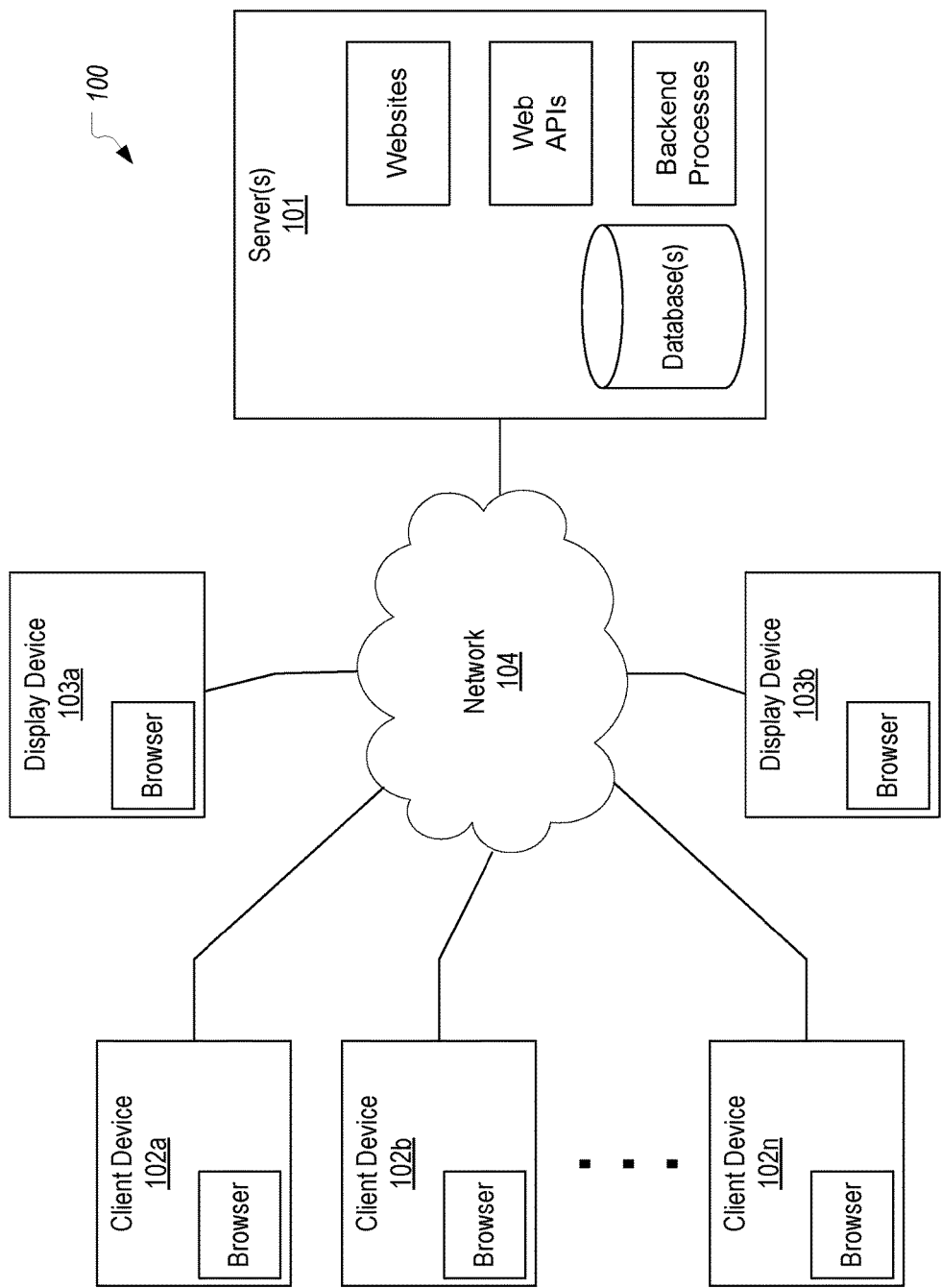
FIG. 1 illustrates an example computing environment in which the communications platform of the present invention can be implemented.

FIG. 1 illustrates an example computing environment 100 in which the present invention can be implemented. Computing environment 100 includes a server (or servers) 101, a number of client devices 102a-102n (where n represents any integer), and a number of display devices 103a, 103b all of which are interconnected via a network 104 which may typically be, but is not required to be, the internet.

Server 101 can represent any suitable server architecture including cloud-based architectures. As shown, server 101 may implement a number of different components of the communications platform including databases, websites, web APIs, and backend processes. Client devices 102a-102n can represent end-user computing devices such as desktops, laptops, tablets, mobile phones, etc. In FIG. 1, these client devices are shown as including a browser which can be employed to communicate with the communications platform of the present invention as will be further described below. Although not shown, client devices 102a-102n may also include an email client or other type of messaging client. However, as will become apparent below, at least some of the client devices 102a-102n may not require an email client. Display devices 103a, 103b can represent any computing device that includes a browser (or similarly functioning application) for communicating with the communications platform for the purpose of displaying information as will be further described below. For example, a display device could be a typical computing device or an internet-connected television. In short, the communications platform of the present invention can comprise a number of client-side components (e.g., browser-based components, email-based components, etc.) and server-side components which interconnect to allow the various types of users to communicate in the manners described below.

Figure 2:
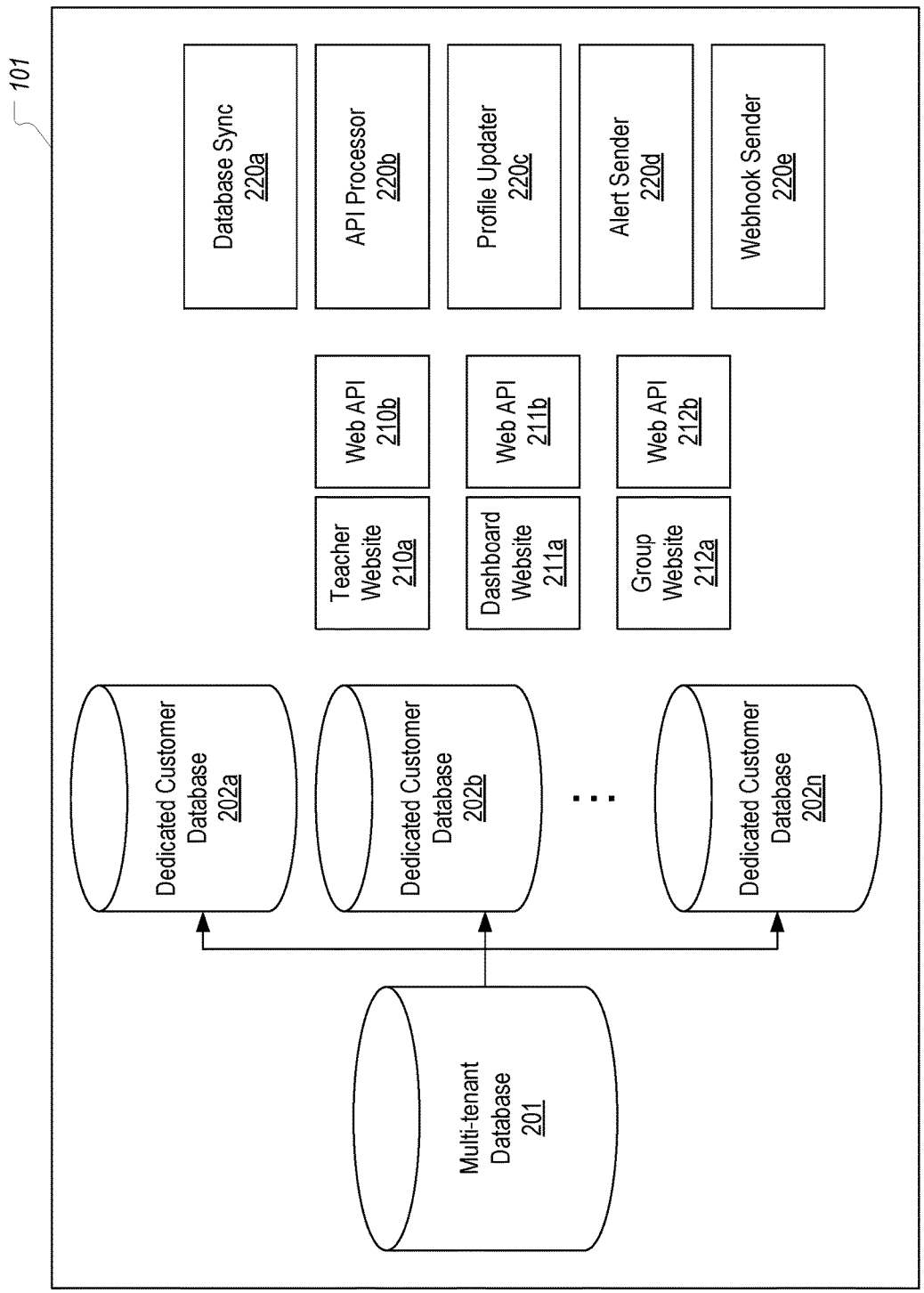
FIG. 2 illustrates various server-side components that can be configured to implement a communications platform.

FIG. 2 provides a more detailed illustration of some of the server-side components of the communications platform. In some embodiments, server 101 may implement a multi-tenant architecture to facilitate scaling of the communications platform. As a general overview, this multi-tenant architecture can include a multi-tenant database 201 which stores data for a number of tenants. In the general example used in this description, a tenant can be equated with an individual school, school district, or similar educational entity. However, a tenant may equally be a business organization, division, group, or any other entity that desires to employ the communications platform to implement a recognition and rewards system. Although not shown in FIG. 2, in some embodiments, multi-tenant database 201 can comprise a primary database and a number of shard databases. In such cases, the primary database can function primarily as a lookup system for identifying in which shard database a particular tenant's data is stored. Using a primary database and multiple shard databases can facilitate scaling of the communications platform. For purposes of the present discussion, however, multi-tenant database 201 can simply be viewed as storing data for a number of different tenants (e.g., tables storing entries pertaining to users from a number of different tenants).

Server 101 can also include a number of dedicated customer databases 202a-202n. Each of databases 202a-202n can pertain to a particular tenant. For example, dedicated customer database 202a can store only entries that pertain to users associated with a first school whereas dedicated customer database 202b can store only entries that pertain to users associated with a second school. The contents of dedicated customer databases 202a-202n can be synchronized from multi-tenant database 201 to allow tenants to access their data for display purposes from the simpler dedicated customer database thereby facilitating and expediting such access.

Server 101 can also provide a number of websites and corresponding web APIs through which users can access the communications platform. For example, a teacher website 210a can be provided to teachers (or equally to managers/supervisors in a work environment) to allow the teachers to interface with the communications platform. Web API 210b can generally represent the interfaces employed by teacher website 210a to access the communications platform. A dashboard website 211a and corresponding web API 211b can be employed to provide a dashboard while a group website 212a and corresponding web API 212b can be employed to implement a group competition.

Server 101 can also include a number of backend processes 220a-220e. As an initial overview, database sync process 220a can be tasked with synchronizing the contents of each of dedicated customer databases 202a-202n with the contents of multi-tenant database(s) 201. API processor process 220b can represent the primary backend process that is tasked with creating and updating individual entries in many of the tables (or data structures) as will be described in detail below. Profile updater process 220c can be tasked with updating a user's profile (e.g., adding or updating an entry in one or more user profile tables in multi-tenant database 201). Alert sender process 220d can generally represent the process that is tasked with sending notifications or alerts to users of the communications platform. For purposes of school-based example employed herein, these notifications can constitute emails or text messages that are sent to parents of students. Finally, webhook sender process 220e can generally represent a process that is employed to facilitate the implementation of group competitions and will be described in detail below.

FIGS. 3A-3C illustrate simplified examples of various tables that may be stored within multi-tenant database 201. Also, portions of these tables will be synchronized to the various dedicated customer databases 202a-202n. However, for ease of illustration, the depicted portions of these example tables will contain entries that pertain only to a single tenant (even though entries pertaining to a number of different tenants would be stored in these tables) and can therefore represent the tables that are stored in both multi-tenant database 201 and a single dedicated customer database.

FIG. 3A depicts a student table 301, a teacher table 302, a class table 303, and a student/class table 304. As their names suggest, student, teacher, and class tables 301-303 store entries pertaining to students, teachers, and classes respectively. In a workplace environment, these tables could alternatively store, for example, entries pertaining to employees, managers, and groups respectively. In short, student table 301 can store entries for individuals that can be recognized and rewarded in the recognition and rewards systems, teacher table 302 can store entries for individuals that will provide these recognitions and rewards, and class table 303 can represent a defined group or entity.

As shown, student table 301 and teacher table 302 can each include a number of fields including a UserID field which stores a unique identifier for the student or teacher, a FirstName field, and a LastName field among possibly many other fields. Although student and teacher tables 301/302 are shown as separate tables, they may equally be structured as a single table that includes a column defining whether the entry defines a student or teacher. Accordingly, the exact structure of the example tables is not essential to the present invention. It is again reiterated that the instances of these tables that are stored in multi-tenant database 201 would include entries for students and teachers across a number of different schools whereas the instances of these tables that are stored in a particular dedicated customer database would only include entries pertaining to a particular school. Database sync process 220a would be tasked with ensuring that the instances of the tables in a particular dedicated customer database are synchronized to contain the relevant entries from the instances of the tables in multi-tenant database 201.

In the examples shown in FIG. 3A, it is assumed that four students (Alyssa Mayer, Brian McGavin, Cecila Cardenas, and Lucy Wooten) and two teachers (Keith Hunt and Greg Mowery) have been registered with the communications platform. It is also assumed that two classes (English and Science) have been created in the communications platform. Each class entry can include a unique identifier, ClassID, and a teacher identifier, TeacherID. For example, the entries in class table 303 indicate that the English class is taught by Keith Hunt (because the English entry includes Teacher01 as its TeacherID) and the Science class is taught by Greg Mowery (because the Science entry includes Teacher02 as its TeacherID). Accordingly, each entry in class table 303 can provide, among other things, a description of the class and an identifier of the teacher of that class (or, in other embodiments, a manager/supervisor of another type of group).

Next, to define which students belong to a particular class, student/class table 304 can be employed. As shown, each entry in student/class table 304 can include a ClassID and a StudentID, the combination of which uniquely identifies a student's belonging to a particular class. Student/class table 304 may also optionally include the first and last name of the student; however, this information could equally be obtained from student table 301 using the corresponding UserID in student/class table 304.

Of particular importance, student/class table 304 includes a number of manager email fields (which in some embodiments may not be limited to email addresses but may include other types of addresses such as a cell phone number for receiving text message or a username for receiving notifications in a communications-platform-specific mobile application). For example, student/class table 304 includes three manager email fields: Man_Email1, Man_Email2, and Man_Email3. Each of these manager email fields store an email address that has been registered for the student in that particular class. The role of these emails will be further described below. For purposes of the present discussion, suffice it to say that one or more email addresses may be registered for a student that is particular to the class. For example, student/class table 304 includes an entry defining that Alyssa Mayer is a student in Keith Hunt's English class and that her mother's email address (mom@email.com) is registered to receive communications pertaining to the English class. In contrast, a separate entry defines that Alyssa Mayer is a student in Greg Mowery's Science class and that both her mother's and father's email addresses (mom@email.com and dad@email.com) are registered to receive communications pertaining to the Science class. By creating a unique entry for each class (as opposed to having a single entry per student), a unique set of email addresses may be registered for each class thereby allowing different sets of individuals to receive communications pertaining to the student's various classes.

Each student may also have a defined amount of reward points in each class. Accordingly, each entry in student/class table 304 includes a points field for storing the student's reward points balance in the corresponding class. For example, Alyssa Mayer is shown as having 5 reward points in English and 45 reward points in Science. The manner in which these reward points can be awarded will be further described below. Rewards points could be used in any suitable way as configured by the teacher or other administrator. Other types of rewards can also be defined, and in such cases, these non-point rewards can be treated in much the same was as other achievements.

FIG. 3B illustrates a number of tables 305-309 that contain entries pertaining to achievements that the students have received. In this example, these achievements include badges, certifications, rewards (which are different from the rewards points mentioned above), actions, and skills. Entries in each of tables 305-309 can commonly include a UserID field for storing an identifier of a student, a ClassID field for storing an identifier of a class to which the defined student belongs, and an ID or name field which identifies the achievement that has been awarded to the corresponding student in the corresponding class. For example, awarded badges table 305 includes an entry which defines that a badge having a BadgeID of Badge01 has been awarded to Alyssa Mayer (Student01) in English (Class01). Although not shown, separate tables can be employed to define the characteristics of each type of achievement that may be awarded. For example, a badges table (such as is shown in FIG. 15), a certifications table, an actions table, etc. may be employed to define the individual achievements that may be awarded. In other words, tables 305-309 define awarded achievements whereas a separate set of tables (not shown) can define all of the achievements that are available to be awarded.

In some embodiments, some types of achievements may be associated with a number of points. For example, awarded actions table 308 includes a points column which defines a number of "action" points that were awarded in conjunction with the award of the particular action. In particular, awarded actions table 308 shows that Alyssa Mayer received the Initiative action in English and also received 10 points. Additionally, awarded skills table 309 shows that skills can be awarded and incremented between levels. In particular, awarded skills table 309 includes a points column defining a current point total for the corresponding skill that has been awarded to the corresponding student in the corresponding class, a current level of that student's skill, the next available level, and the point total to reach the next level. For example, awarded skills table 309 defines that Alyssa Mayer has been awarded the skill having the identifier of Skill01 in English, that this skill is at level 1 with a point total of 4, and that 10 points are required to advance to the next level which is level 2. For simplicity, the values of the current and next level fields are shown as numeric values. However, in other embodiments, these values may not be numeric (e.g., novice, intermediate, advanced).

An important aspect of the communications platform of the present invention is that it enables a teacher (or manager) to easily and quickly issue challenges to a student (or employee) by sending communications to a parent, guardian, or other "managing" individual (or, in some workplace instances, directly to the employee). These challenges can be associated with an achievement such that the student may receive the achievement upon completing the challenge. This process will be described in detail below. However, before describing the process, the underlying tables used by the communications platform to implement these communications will be described.

FIG. 3C illustrates a communications header table 310 and a communications table 311. Communications header table 310 is employed to store entries pertaining to challenges that have already been issued to one or more students in a class. For example, each entry in communications header table 310 can include a ClassID identifying the class in which the challenge was issued, a communication ID (CommID) that uniquely identifies the particular challenge, a date on which the challenge was issued, an ItemID which associates a particular achievement with the challenge (e.g., associates a particular badge or action with the challenge), a message to be contained with the communication sent to the parent/guardian of each student to which the challenge is issued and which describes the challenge to be completed, a number of points to be awarded for successful completion of the challenge, and an indication of whether parental feedback should be allowed. For example, the first entry in communications header table 310 indicates that a challenge was issued in Keith Hunt's English class on Jun. 8, 2016 that included a message of "Complete . . . ," and that would award the Initiative action and 5 action points if completed. This entry also indicates that parental feedback to the challenge is allowed.

As can be seen, communications header table 310 does not define to which students the challenge has been issued. Instead, a separate communications table 311 is maintained for this purpose. As shown, communications table 311 includes entries defining a ClassID identifying a particular class, a UserID defining a particular student, and a CommID defining a particular communication from communications header table 310 to thereby uniquely identify in which class and to which student a particular challenge was issued. Each entry can also include a status field defining the status of the challenge (e.g., completed, pending, incomplete). Challenges may have a time limit (e.g., 24 hours) during which the parent/guardian must confirm that the student has completed the challenge. In such cases, a status of "Completed" can represent that the parent/guardian confirmed the student's completion of the challenge within the allotted 24 hours, a status of "Pending" can represent that the parent/guardian has not confirmed completion of the challenge but the 24 hour period has not lapsed, and a status of "Incomplete" can represent that the 24 hour period lapsed without having first received confirmation of completion of the challenge (or equally that an indication that the challenge was not completed was received).

Each entry in communications table 311 may also include one or more manager email fields and corresponding comment fields. The manager email field can define the email address to which the challenge was sent for the corresponding student. By default, when a challenge is issued, the corresponding communication can be sent to the email address(es) registered for the corresponding student (i.e., the values stored in the manager email fields defined for the student/class combination in student/class table 304). However, as will be described below, a teacher can be enabled to specify which email addresses to send a particular challenge to upon issuing the challenge. For this reason, each entry in communications table 311 can store the specific email addresses defined for that communication. The corresponding comment fields can be used to store comments or feedback received from the parent/guardian when they specify whether the student completed the challenge as will be further described below.

Accordingly, at any given time, communications table 311 can be accessed to identify which challenges have been presented to any particular student including identifying which parent(s)/guardian(s) received each corresponding communication and whether they provided feedback. Likewise, communications header table 310 can be accessed to identify which challenges have been issued in each class including the characteristics of these challenges. Similarly, achievement tables 305-309 can be accessed at any time to identify which achievements have been awarded to any particular student in any particular class. The use of dedicated customer databases 202a-202n can facilitate such access. Further, in some embodiments, a text-based copy of each student's information (e.g., the student's achievements) can be separately maintained to facilitate reporting an individual student's profile without the overhead of accessing the database(s).

Figure 4A:
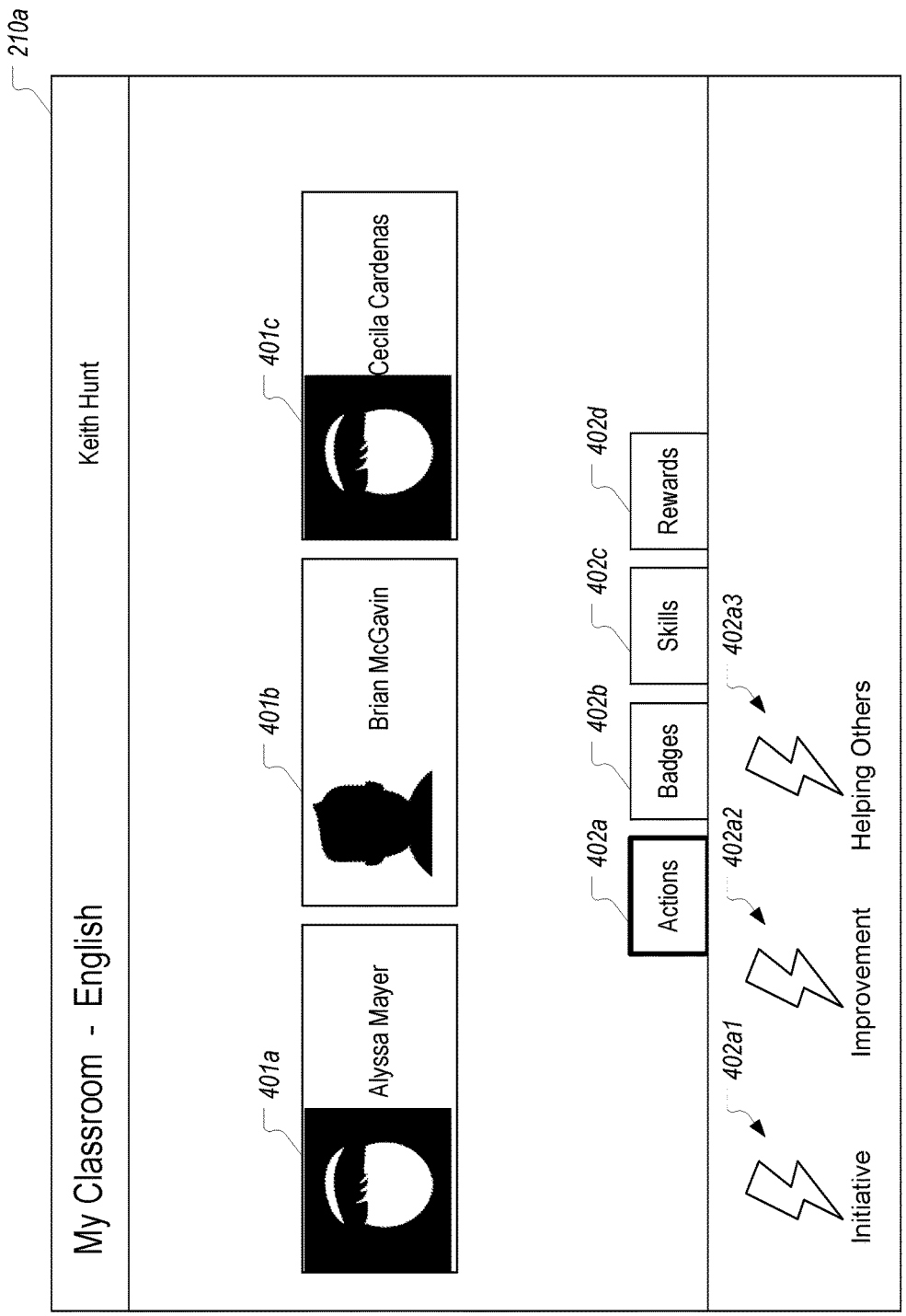
FIGS. 4A-4D illustrate an example user interface that can be displayed to a teacher to allow the teacher to interface with various features provided by the communications platform including to issue challenges to students by sending such challenges to a parent or guardian of the students.

Turning now to FIGS. 4A-4D, an example process of issuing a challenge to a student will be described. Initially, FIG. 4A represents an example of teacher website 210a. For purposes of this example, it will be assumed that Keith Hunt has logged into teacher website 210a and has selected to view his English class (assuming that he may teach other classes and would therefore be able to view other classes). It will also be assumed that Keith Hunt is employing client device 102a to access teacher website 210a. Accordingly, when Keith Hunt provides input constituting a request to view his English class, the input (or more specifically the ClassID "Class01") will be passed through web API 210b and used to query student/class table 304 for any entry that includes Class01 as its ClassID. The results of this query (which will include the UserID of each student in the class) can then be used to populate teacher website 210a with a representation of each student in the class (and possibly other information that can be obtained from other tables using the obtained UserIDs such as information stored in student table 301). In this example, it will be assumed that student/class table 304 includes three entries having a ClassID of Class01 and that these entries pertain to Alyssa Mayer, Brian McGavin, and Cecila Cardenas. Therefore, representations 401a-401c are included in teacher website 210a once customized for Keith Hunt's English class.

Although not shown, teacher website 210a can be configured such that each of representations 401a-401c can be selected to obtain profile information about each student (e.g., by clicking on the student's picture). For example, representation 401a can be selected to view any achievements that Alyssa Mayer has been awarded in the English class. To enable this, teacher website 210a, in response to the selection of representation 401a, can be configured to submit a request via web API 210b that includes Alyssa Mayer's UserID "Student01" and Keith Hunt's English ClassID "Class01." Web API 210b can employ this combination of User and Class ID to query each of tables 305-309 to identify each achievement that has been awarded to Alyssa in the English class including characteristics of such achievements some of which may be obtained from other tables using the corresponding ID of the particular achievement.

Teacher website 210a can also be configured to present the various types of achievements that are available to be awarded to the students. For example, in FIG. 4A, teacher website 210a includes an Actions tab 402a, a Badges tab 402b, a Skills tab 402c, and a Rewards tab 402d. Each of these tabs can be selected to display (e.g., in the bottom section of the webpage) each of the achievements of the selected type. For example, in FIG. 4A, it is assumed that Keith Hunt has selected Actions tab 402 and therefore an Initiative action 402a1, an Improvement action 402a2, and a Helping Others tab 402a3 are displayed. The availability of particular achievements within a particular class can be defined using tables in much the same way as described above. For example, one or more tables may be maintained that each associate a class's ClassID with an identifier of any achievement that has been associated with that class such that the ClassID can be used to query the table(s) to obtain all available achievements by type.

Figure 4B:
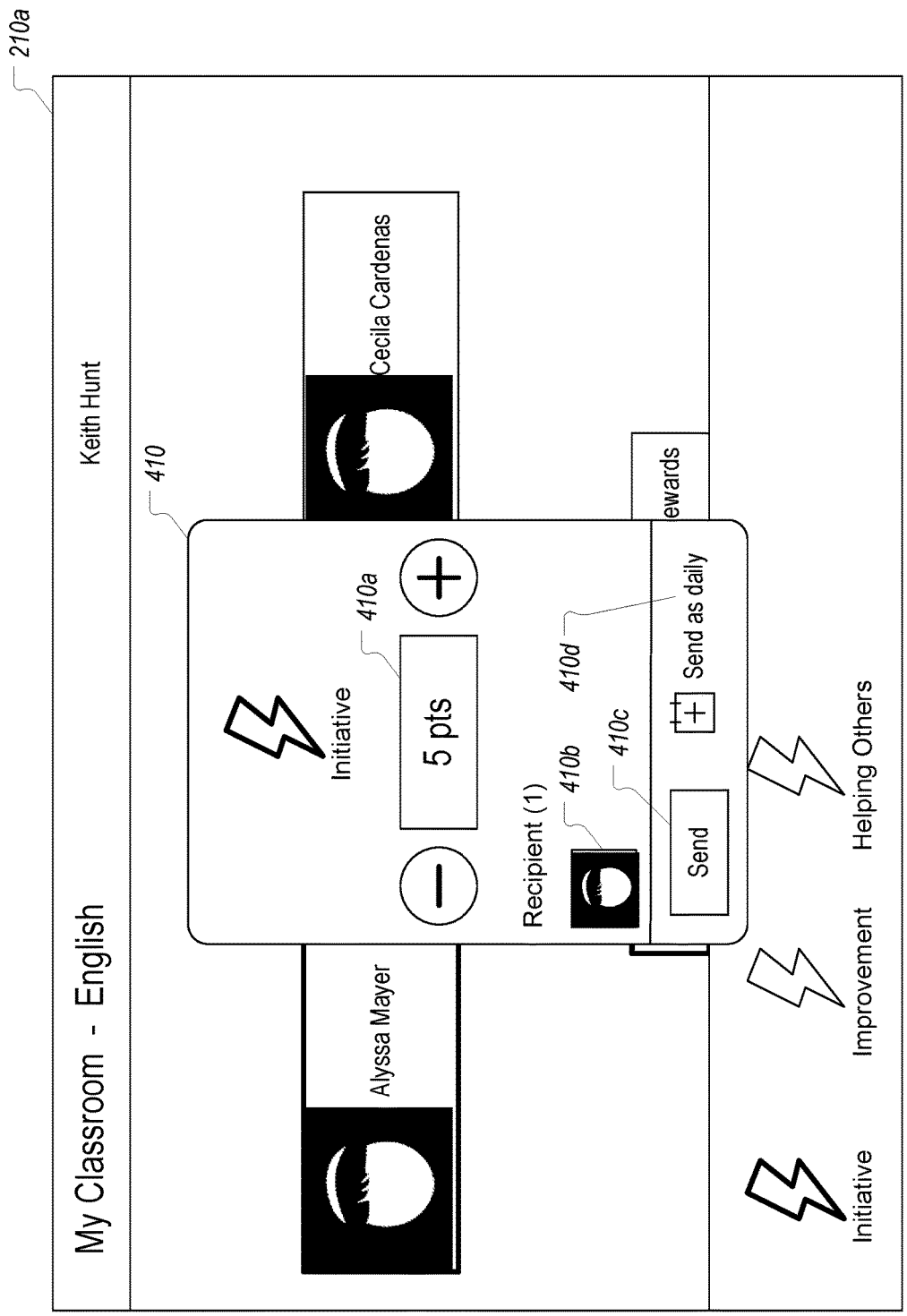

Teacher website 210a can be configured to allow the teacher to award any achievement to a student at any time and for any reason. For example, if during class, Alyssa Mayer shows great initiative, Keith Hunt may select representation 401a (to select Alyssa) and then select action 402a1. In response, a dialog 410 can be presented allowing Keith Hunt to immediately award the Initiative action to Alyssa including awarding any number of action points for the Initiative action. For example, as shown in FIG. 4B, dialog 410 includes an action points field 410a for defining an amount of action points to include in the award, a recipient area 410b identifying each recipient (of which there may be more than one), and a send button 410c which when selected will immediately award the action.

Accordingly, if Keith Hunt selected send button 410c while dialog 410 includes the depicted information, teacher website 210a can generate appropriate calls to web API 210b to pass Alyssa Mayer's UserID, the ClassID of Keith Hunt's English class, an identifier of the Initiative action, the amount of reward points, and possibly other information. Upon receiving this information, web API 210b can cause Action table 308 to be updated accordingly (e.g., by adding a new entry defining the award of the Initiative action and 5 actin points to Alyssa in Keith Hunt's English class or by updating an existing entry if Alyssa had already been awarded this action). A similar process can be performed when another type of achievement is awarded. However, in some cases, an achievement may not include corresponding points. Therefore, in such cases, a corresponding dialog may not provide an option to award points. Also, in some embodiments, teacher website 210a may allow the teacher to award reward points when an achievement is awarded. For example, dialog 410 could include an option to "Award matching reward points" which would cause an amount of reward points corresponding to the value defined in field 410a to be awarded to Alyssa by incrementing the Points field in the corresponding entry in student/class table 304. These reward points can be used by the student in class to "purchase" certain awards and are therefore similar to currency and differ from achievement points which relate to a level of achievement.

Figure 4C:
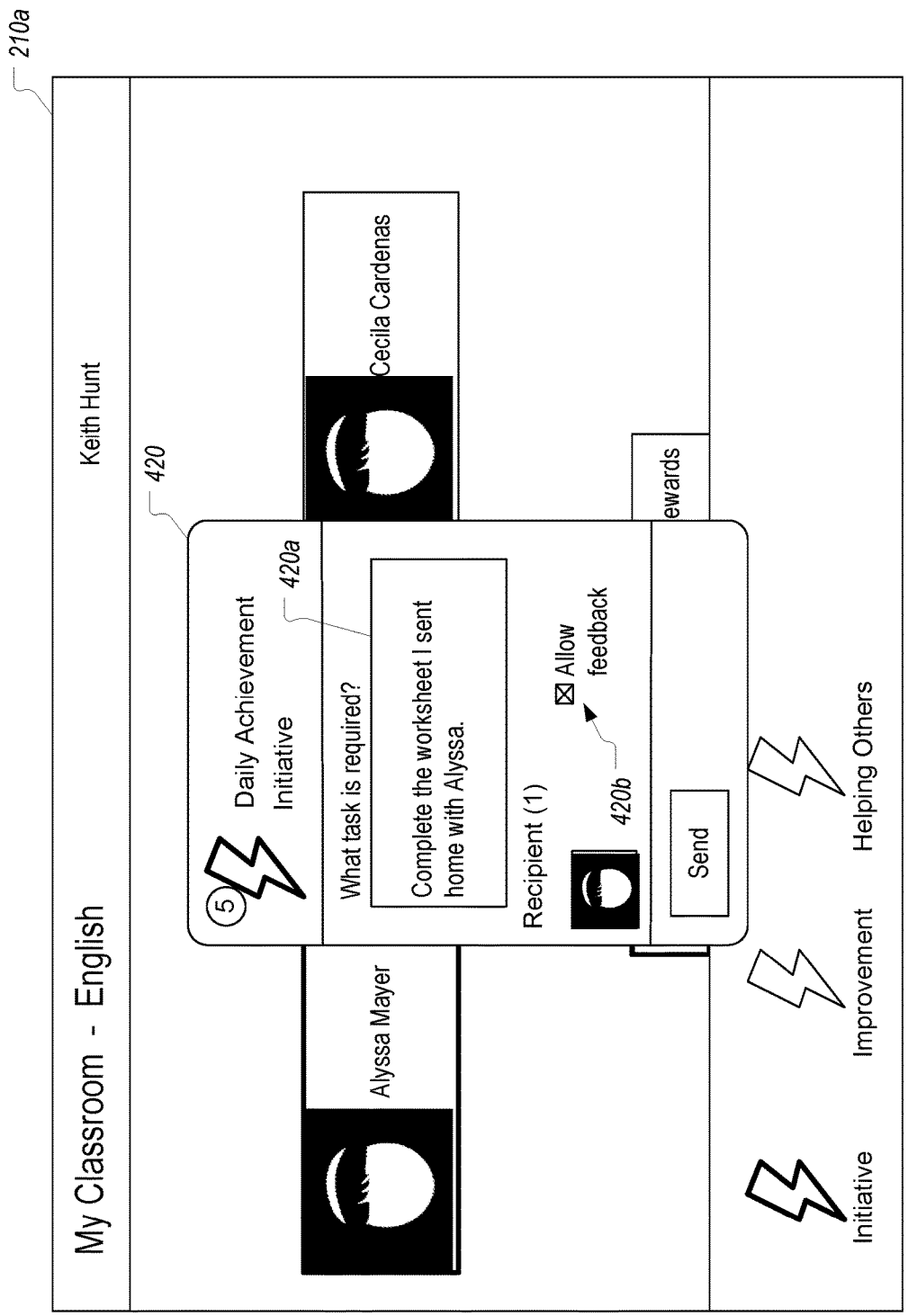
Figure 4D:
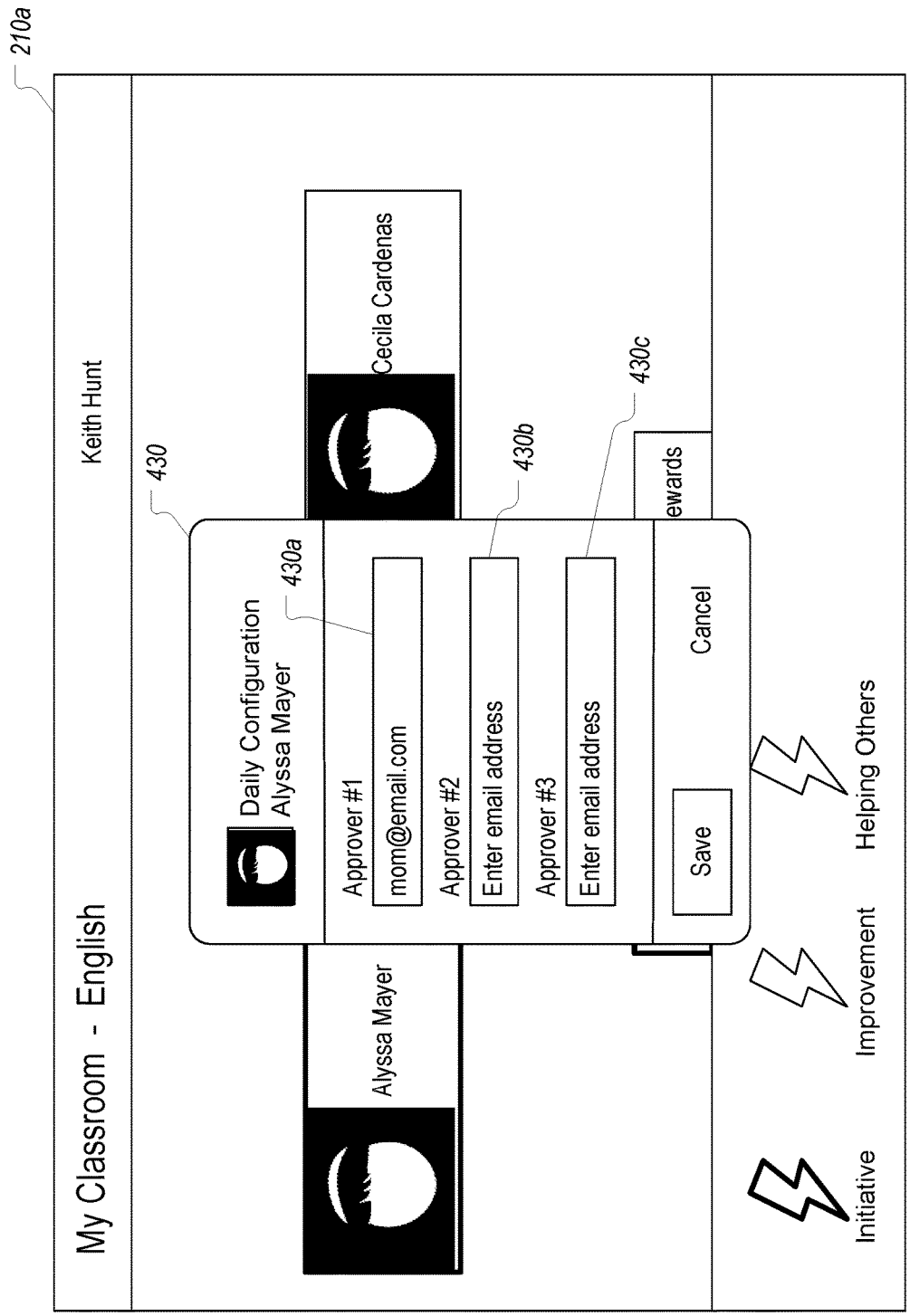

In addition to this type of immediate award of an achievement, teacher website 210a can also be configured to allow the teacher to issue a challenge to one or more students. FIGS. 4B-4D generally represent this process. As shown in FIG. 4B, dialog 410 includes a "Send as daily" element 410d. In this context, the term "daily" can be used interchangeably with the term "challenge" and refers to the fact that the challenge is issued for a 24 hour period.

When a challenge is issued, the award of an achievement is contingent upon the student completing (and the parent/guardian confirming the completion of) the challenge. Therefore, in the case represented in FIG. 4B, the Initiative action will not be immediately awarded to Alyssa if Keith Hunt selects element 410d but will require Alyssa to complete a challenge to receive the action. FIG. 4C represents a dialog 420 that can be displayed when element 410d is selected. The contents of dialog 420 are based on the contents of dialog 410 when element 410d was selected. Therefore, dialog 420 indicates that it pertains to the Initiative action and that 5 action points will be awarded for successful completion of the challenge. Dialog 420 can include a text box 420a into which Keith Hunt can input the challenge or task that must be completed. As with dialog 410, dialog 420 also identifies which students will receive the challenge which in this case is assumed to be only Alyssa. Dialog 420 also includes an Allow Feedback button 420b which when selected will allow Alyssa's parent(s)/guardian(s) to provide feedback to Keith Hunt regarding this specific challenge.

For a challenge to be issued, the student must be appropriately configured. This includes having at least one approver email defined for the student in the particular class. FIG. 4D illustrates an example of a dialog 430 that can be displayed to allow Keith Hunt to configure Alyssa Mayer to receive a challenge. In some embodiments, dialog 430 can be displayed in response to selecting the icon of Alyssa that is included in dialog 420. As shown, dialog 430 can include fields 430a-430c each of which is configured to receive an approver's email address. In some embodiments, the values of the fields can be automatically populated with the contents of the manager email fields in the corresponding entry in student/class table 304. For example, student/class table 304 includes an entry for Alyssa Mayer in the English class that includes the email address mom@email.com as the first manager email. This manager email could have been predefined during registration of Alyssa Mayer in the English class or could have been input into dialog 430 during a previous creation of a challenge in the English class. In any case, fields 430a-430c can either have a prepopulated email address (based on an entry in student/class table 304) or can receive an email address at the time of challenge issuance. Once fields 430a-430c have the desired email address(es), the save button can be pressed to return to dialog 420. If a new/different email address is input into dialog 430, this email address can be populated back to student/class table 304 (e.g., via web API 210b) in some embodiments so that it will become a default address for future challenges.

Figure 5A:
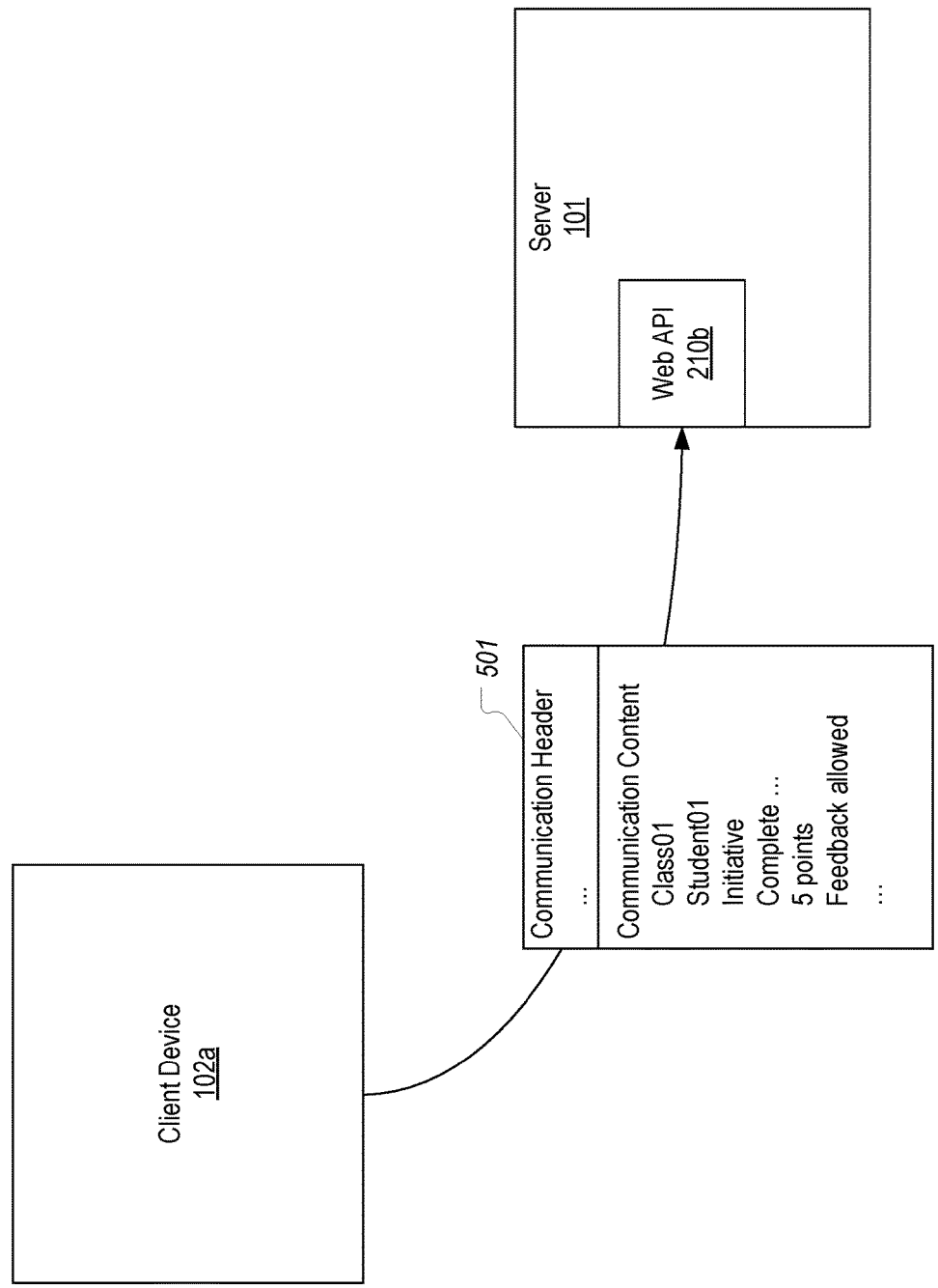
FIGS. 5A and 5B illustrate a process by which the communications platform can create, issue, and track a challenge sent by a teacher to a student's parent, guardian, or other registered individual in the context of a challenge that is associated with an action.
Figure 5B:
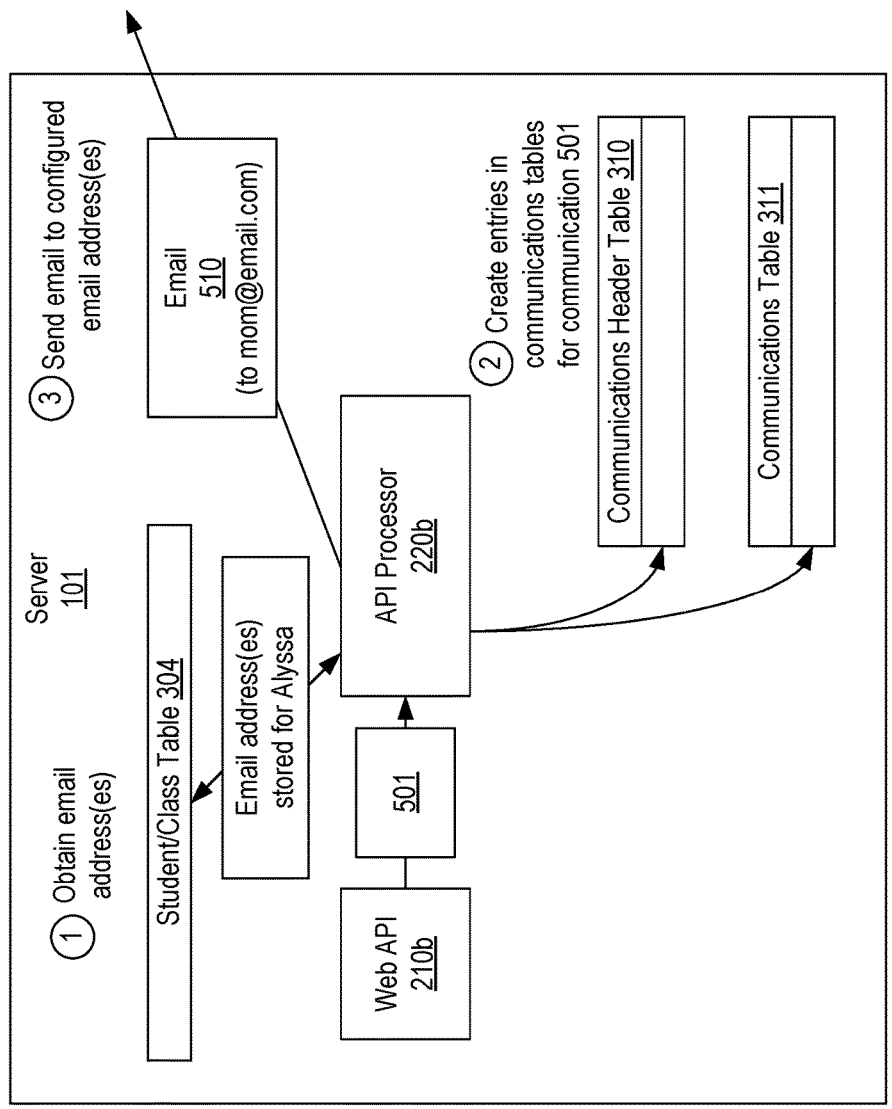

With Alyssa's class-specific profile configured with at least one approver email address, the challenge can be issued by selecting the send button in dialog 420. FIGS. 5A and 5B generally represent the processing that can be performed by the communications platform in response to the send button being selected. In FIG. 5A, the browser on client device 102a, which is assumed to be the computing device used by Keith Hunt to access teacher website 210a, is shown as sending a communication 501 to server 101 via web API 210b. Communication 501 can include content defining the challenge that is to be issued to Alyssa. For example, communication 501 is shown as including the identifier of Keith Hunt's English class (Class01), an identifier of the student(s) to whom the challenge is to be issued (which is this case is just Alyssa whose identifier is Student01), an identifier of the achievement associated with the challenge (Initiative), the instructions that were input into text box 420a ("Complete . . . "), the number of action points to be awarded for successful completion of the challenge (5), and an indication that feedback should be allowed. Of course, communication 501 can include additional content beyond what is shown in FIG. 5A. The contents of such communications would also vary slightly based on the type of achievement that is associated with the challenge.

FIG. 5B then shows how server 101 can respond to receiving communication 501. As shown, web API 210b can pass communication 501 (or at least some of the contents of communication 501) to API processor 220b. Based on the contents of communication 501, API processor 220b can perform three basic functions. First, for each StudentID included in communication 501, API processor 220b can query student/class table 304 using the combination of the StudentID and the ClassID defined in communication 501 to obtain the email address(es) that have been stored for that student in that class. For example, with reference to FIG. 3A, a query of student/class table 304 using Class01 and Student01 as the parameters will return mom@email.com.

In a second step, API processor 220b can create entries in communications header table 310 and communications table 311 corresponding to communication 501. For example, in FIG. 3C, the first entry in communications header table 310 can represent the entry that API processor 220b could create when communication 501 is received. As shown, this entry includes Class01 as the ClassID to indicate that the entry pertains to Keith Hunt's English class, a CommID of Comm01 that uniquely identifies the challenge to be sent, a date of Jun. 8, 2016 defining when the challenge was issued, an ItemID of Initiative to identify which achievement is associated with the challenge, the message/task, the points associated with the achievement, and an indicator of whether feedback is allowed. This entry in communications header table 310 could be created before or after querying student/class table 304 as described above.

Also, as part of the second step, an entry can be added to communications table 311 for each student to which the challenge has been issued (i.e., for each StudentID included in communication 501). Entries in communications table 311 can be created after having obtained the associated email address(es) for each student. With reference to FIG. 3C, the first entry in communications table 311 can represent the entry created for communication 501. As shown, this entry includes Class01 and Student01 to uniquely associate the entry with Alyssa Mayer and Keith Hunt's English class. This entry also includes Comm01 as the CommID thereby linking the entry to the corresponding entry in communications header table 310. A status field can also define the status of the challenge. In FIG. 3C, the status of the challenge issued to Alyssa is shown as having been completed for purposes of illustrating the functionality described below. However, it is noted that this status can initially be set to pending. Further, this entry can include each associated email address that was obtained from student/class table 304. In this case, because only a single email address is associated with Alyssa Mayer in the English class, the Man_Email1 field includes mom@email.com while the remaining email fields are left blank. Finally, the entry can include a comment field for each email address field. Although this field is shown as including a comment in FIG. 3C, it will initially remain blank when the entry is created.

With the corresponding entries created in communications header table 310 and communications table 311, API processor 220b can then cause an email or other communication (e.g., a text message or a notification in a mobile application) to be sent to each email address associated with each student defined in communication 501 (e.g., via alert sender process 220d). In this case, a single email 510 will be sent to mom@email.com which can include content pertaining to the issued challenge.

To summarize, when a challenge is issued, teacher website 210a can be configured to submit a communication defining the challenge via web API 210b. In response, the communications platform can create an entry in communications header table 310 to represent the challenge generally and can also create an entry in communications table 311 for each student to whom the challenge was issued. These entries in communications table 311 can each represent a communication that will be or has been sent to an "approver" who will be tasked with informing the student of the challenge and reporting whether the student has completed the challenge. As mentioned above, in some cases, the approver and student may be the same person such as, for example, when the student is older or when the invention is implemented in a work environment.

Figure 6B:
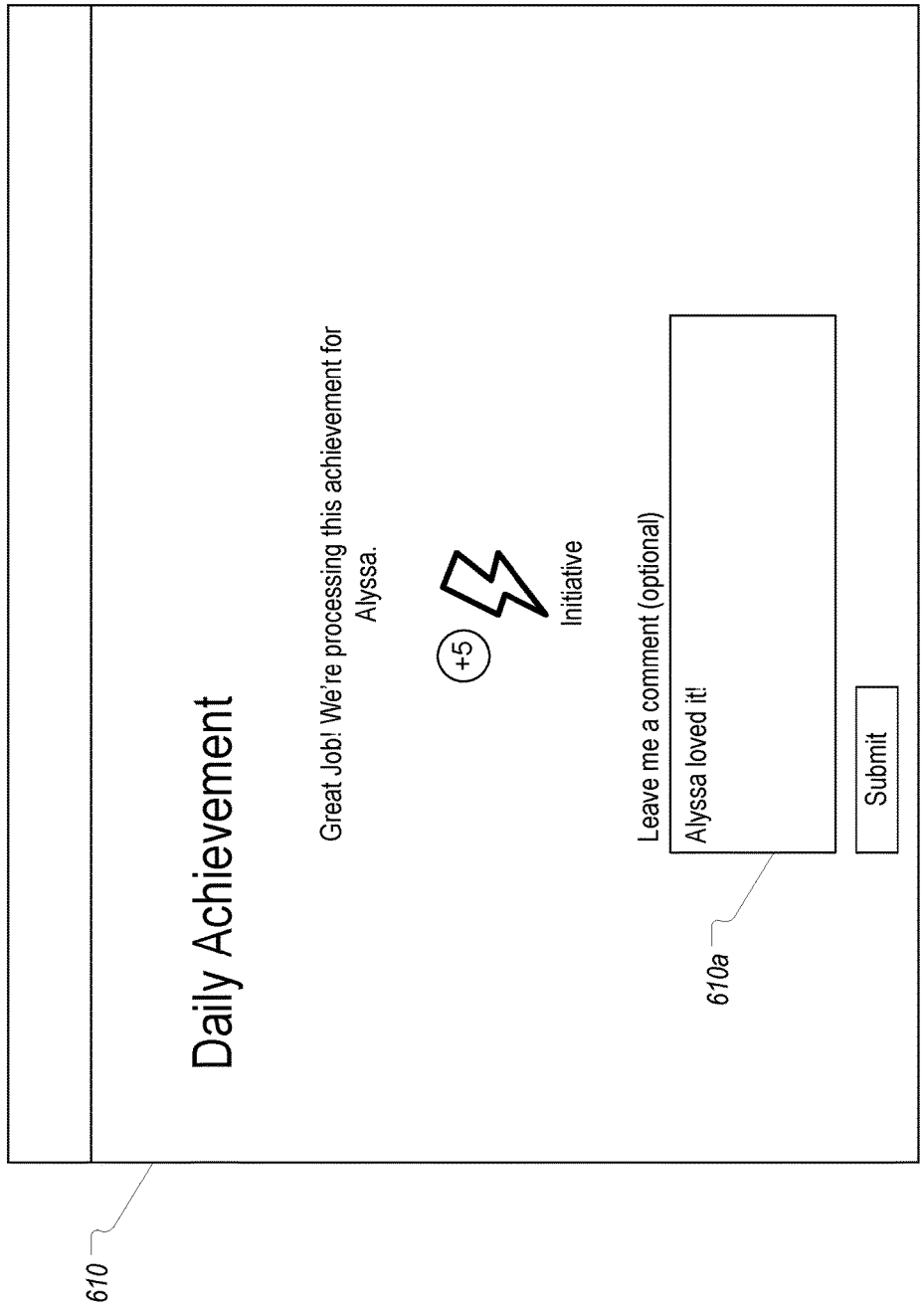

FIGS. 6A and 6B illustrate an example of the contents of email 510 that is sent to Alyssa's mom (mom@email.com) to issue Keith Hunt's challenge to Alyssa Mayer. As shown, email 510 can identify that it pertains to a daily achievement (i.e., a challenge) issued by Keith Hunt and can include an indication 510a of the task or challenge that Alyssa must complete. Indication 510a can also include Yes and No buttons which will allow Alyssa's mother (or approver) to confirm whether she has completed the task. Email 510 can also specify the achievement (and points) to be awarded for successful completion of the task.

Indication 510a can be configured such that the selection of either the Yes or No button will cause a webpage 610 to be generated (e.g., by sending appropriate request(s) to web API 210b) as is shown in FIG. 6B. The configuration of webpage 610 can be based on whether the Yes or No button was selected. For example, in FIG. 6B, it is assumed that Alyssa's mom has selected the Yes button, and therefore, web API 210b has caused webpage 610 to include a congratulatory message. Also, webpage 610 can be configured to include a feedback dialog 610a due to the value stored in the Allow Feedback field of the corresponding entry in communications header table 310. In this case, the Comm01 entry indicates that feedback should be allowed, and therefore, webpage 610 includes feedback dialog 610a.

Figure 7A:
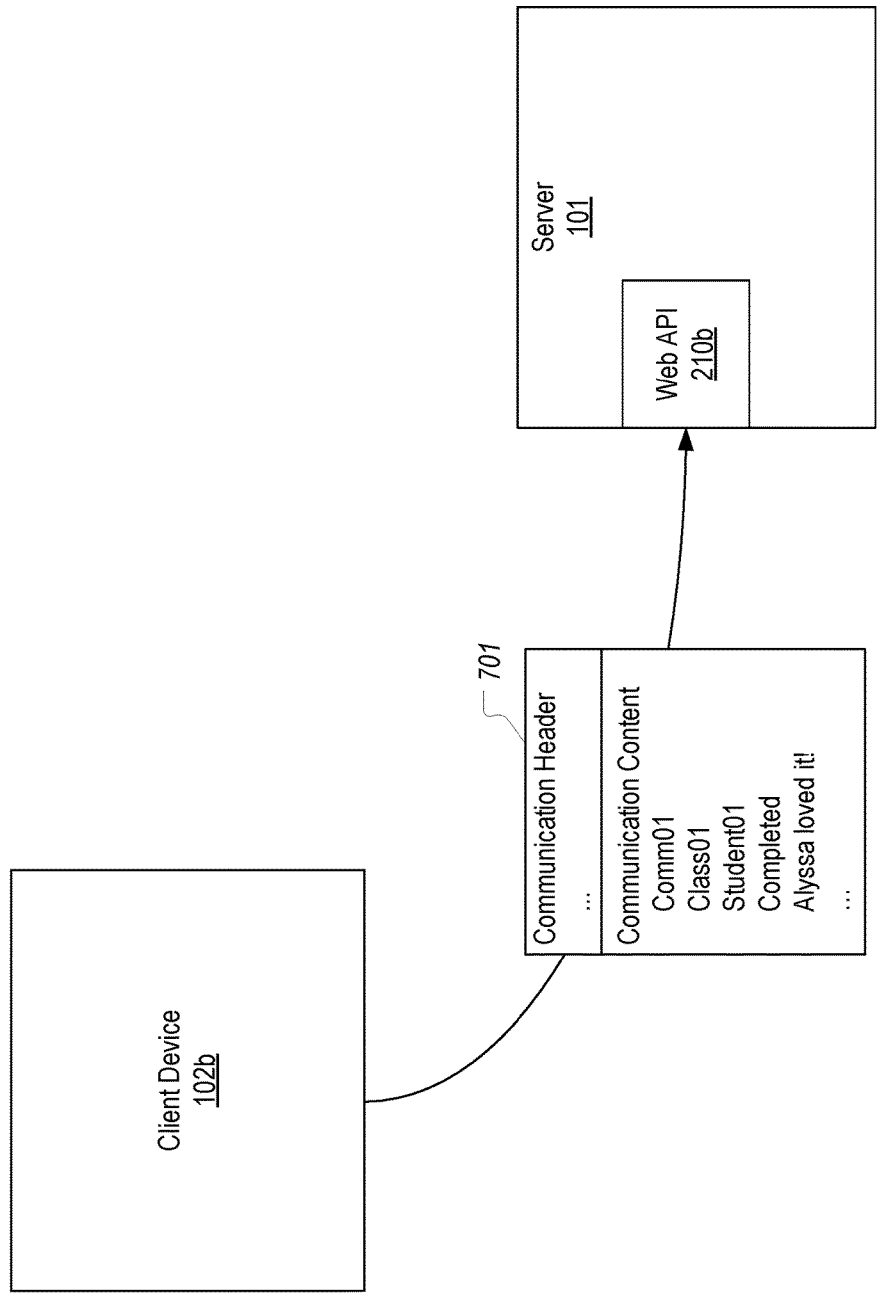
FIGS. 7A and 7B illustrate a process by which the communications platform can process the completion of a challenge.
Figure 7B:
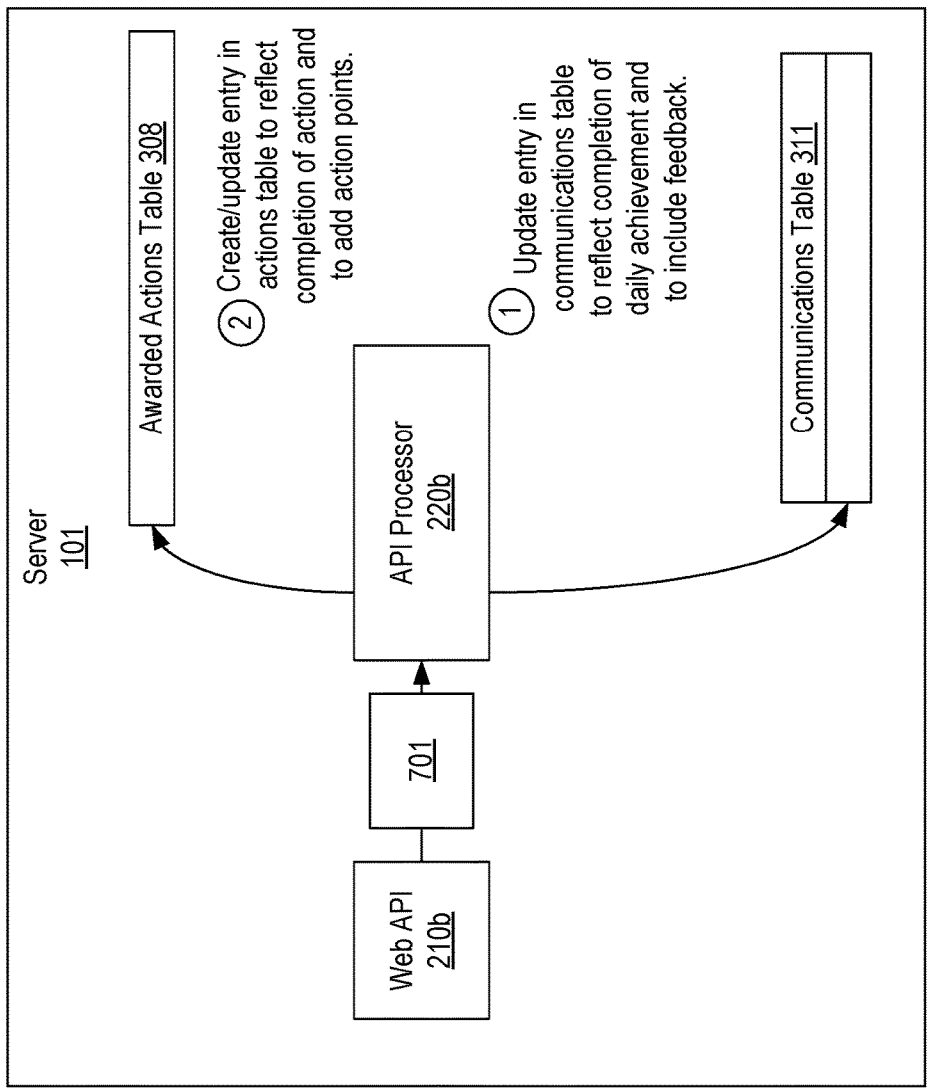

FIG. 6B shows that Alyssa's mother has input the feedback of "Alyssa loved it!" which can be sent back to web API 210b when the submit button is selected. For example, as shown in FIG. 7A, client device 102b, which is assumed to be the computing device employed by Alyssa's mother when submitting the feedback, is shown as sending a communication 701 to server 101 via web API 210b. As shown in FIG. 7B, web API 210b can route communication 701 (or at least a portion of the contents of communication 701) to API processor 220b which can then perform two general tasks. First, API processor 220b can update the corresponding entry in communications table 311 to reflect the completion of the challenge and to include the feedback. Communication 701 can include the ClassID, StudentID, and CommID associated with email 510 for this purpose (i.e., to allow the identification of the proper entry in communications table 311). For example, in FIG. 3C, the first entry in communications table 311 is shown as including "Alyssa loved it!" in the Comment_Email1 field and as having a status of completed.

Second, based on the type of achievement associated with the challenge, API processor 220b can update the appropriate achievement table. In this case, API processor 220b can employ the CommID (Comm01) to access communications header table 310 to identify that the Initiative action and 5 action points were associated with the challenge. API processor 220b can therefore access action table 308 to create an entry. For example, in FIG. 3B, awarded actions table 308 includes a first entry for Alyssa (Student01) in English (Class01) which represents the Initiative action and defines an action point balance of 5. It is noted that awarded actions table 308 may already include an entry defining the award of this initiative action to Alyssa in the English class if Alyssa had already been awarded this action. Even so, a new entry can be created in awarded actions table 308 for the completion of this challenge so that an entry exists for any action that has been awarded even if the action has already been awarded.

With the feedback stored in communications table 311, it can then be presented to Keith Hunt at any time in conjunction with the other information pertaining to the challenge. For example, teacher website 210a can allow Keith Hunt to review all previously issued challenges in conjunction with any feedback that has been received. The structure of the communications platform facilitates this in a scalable and streamlined fashion.

Although not shown, if a second email address had been defined in Alyssa's English class entry in student/class table 304, email 510 could have also been sent to this address thereby allowing that approver to also confirm completion of the task and submit feedback which could be stored in the Comment_Email2 field.

As can be seen, email 510 is a simple and easy way to involve a student's parent, guardian, or other individual in a challenge. For example, Keith Hunt is not required to draft an email or even create achievements. Instead, he can simply select a student and an achievement and then input the task within teacher website 210a. The communications platform will then handle the process of communicating with the approver(s) including storing any feedback in conjunction with the challenge for later review. The communications platform can also handle the process of tracking completion of a challenge and awarding an achievement. In short, the communications platform provides a complete solution for implementing a recognition and rewards system that seamlessly involves parents or guardians.

Figure 8A:
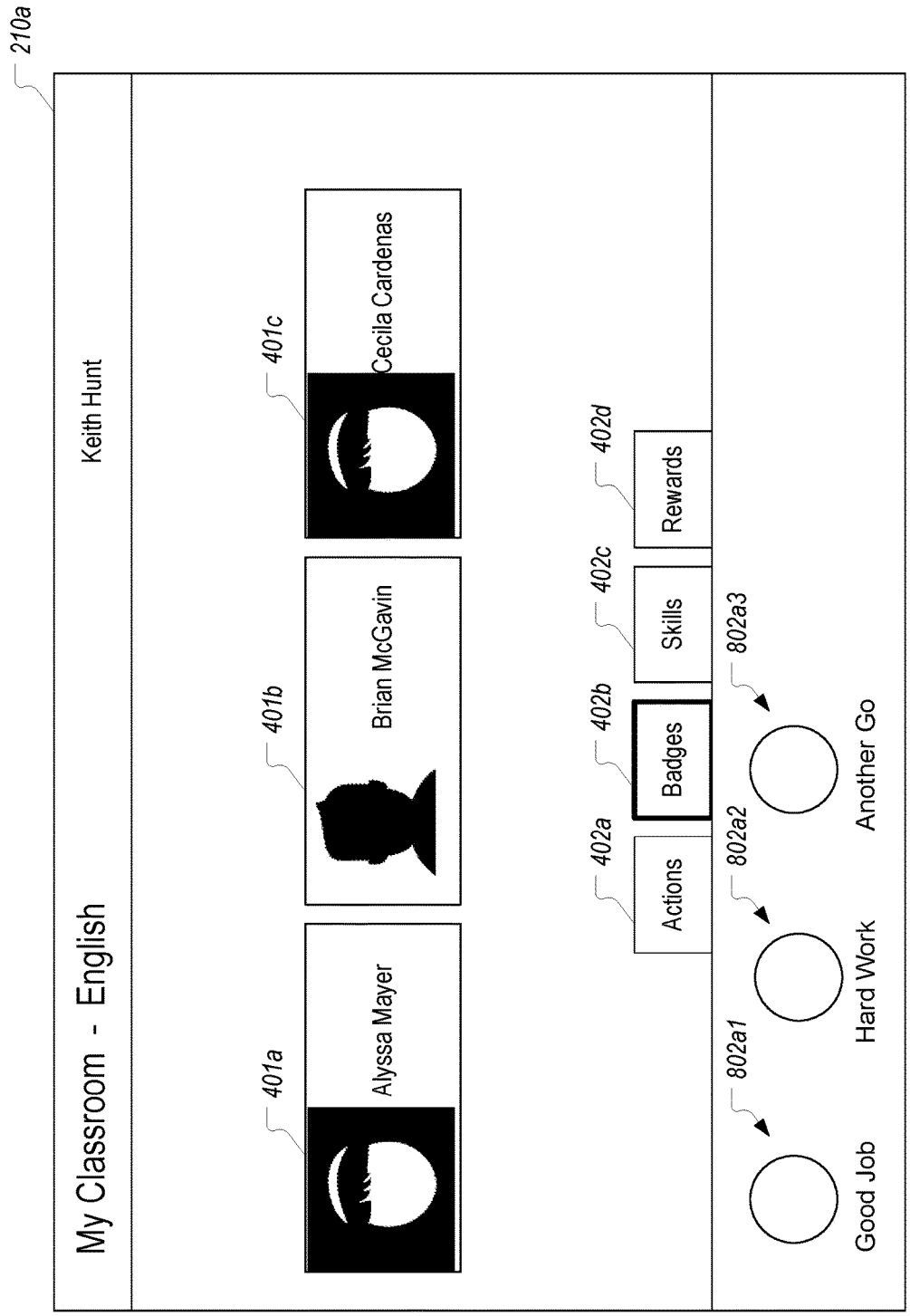
FIGS. 8A and 8B illustrate another example of the user interface that can be displayed to a teacher.
Figure 8B:
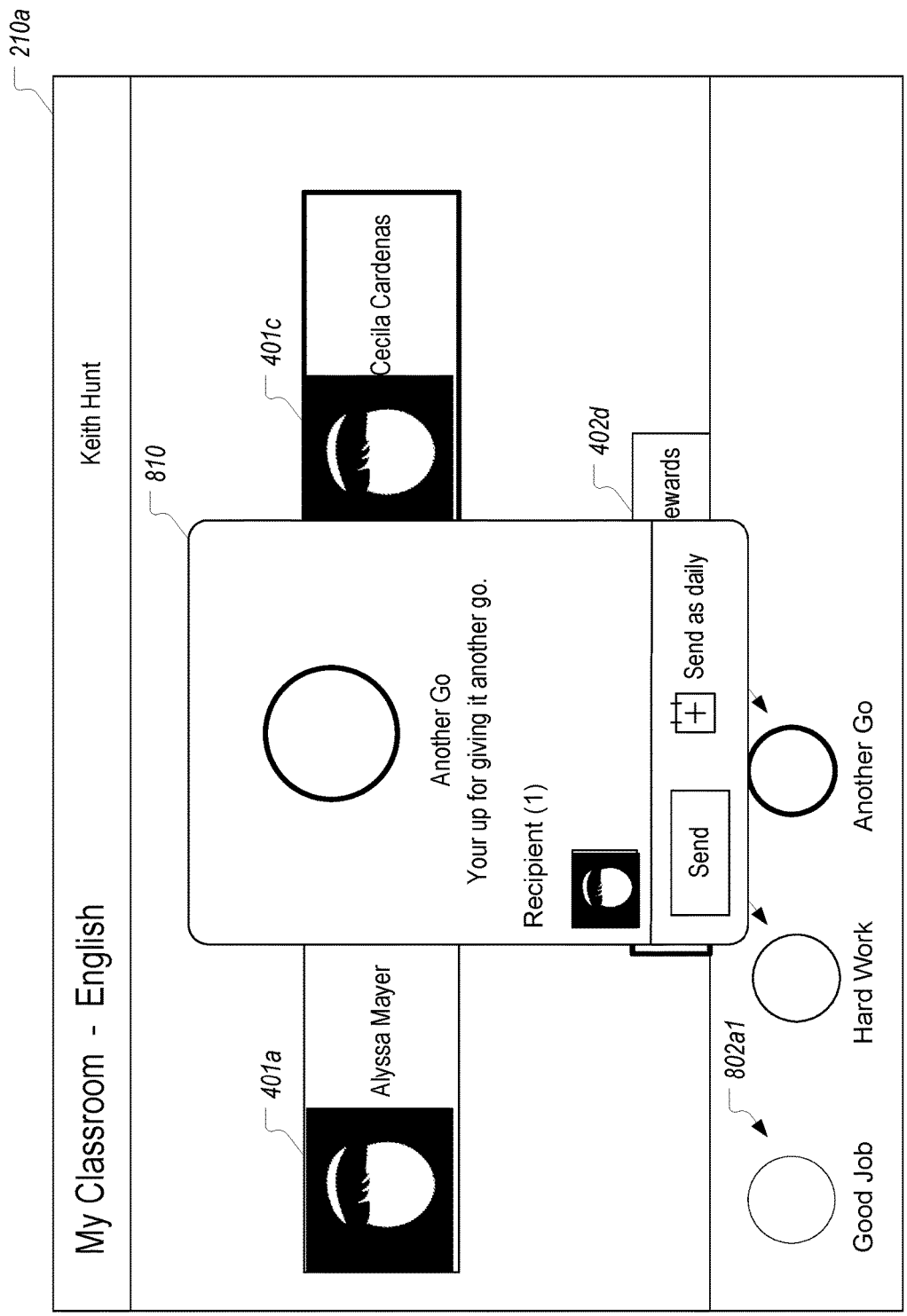

FIGS. 8A and 8B are similar to FIGS. 4A and 4B but represent an example where a challenge associated with a badge is issued to Cecila Cardenas. As shown in FIG. 8A, it is assumed that Keith Hunt has selected badges tab 402b thereby causing the bottom portion of website 210a to include a Good Job badge 802a1, a Hard Work badge 802a2, and an Another Go badge 802a3. Then, in FIG. 8B, it is assumed that Keith Hunt has selected representation 401c (for Cecila) and badge 802a3 (for the Another Go badge). In response, dialog 810 is displayed which includes an indication of the badge to be awarded and an indication of Cecila as the recipient. Although not shown, it will be assumed that Keith Hunt decides to send this as a daily achievement/challenge including providing input defining the task similar to what is shown in FIG. 4C. However, it will also be assumed that Keith Hunt selects to not allow feedback.

Figure 9A:
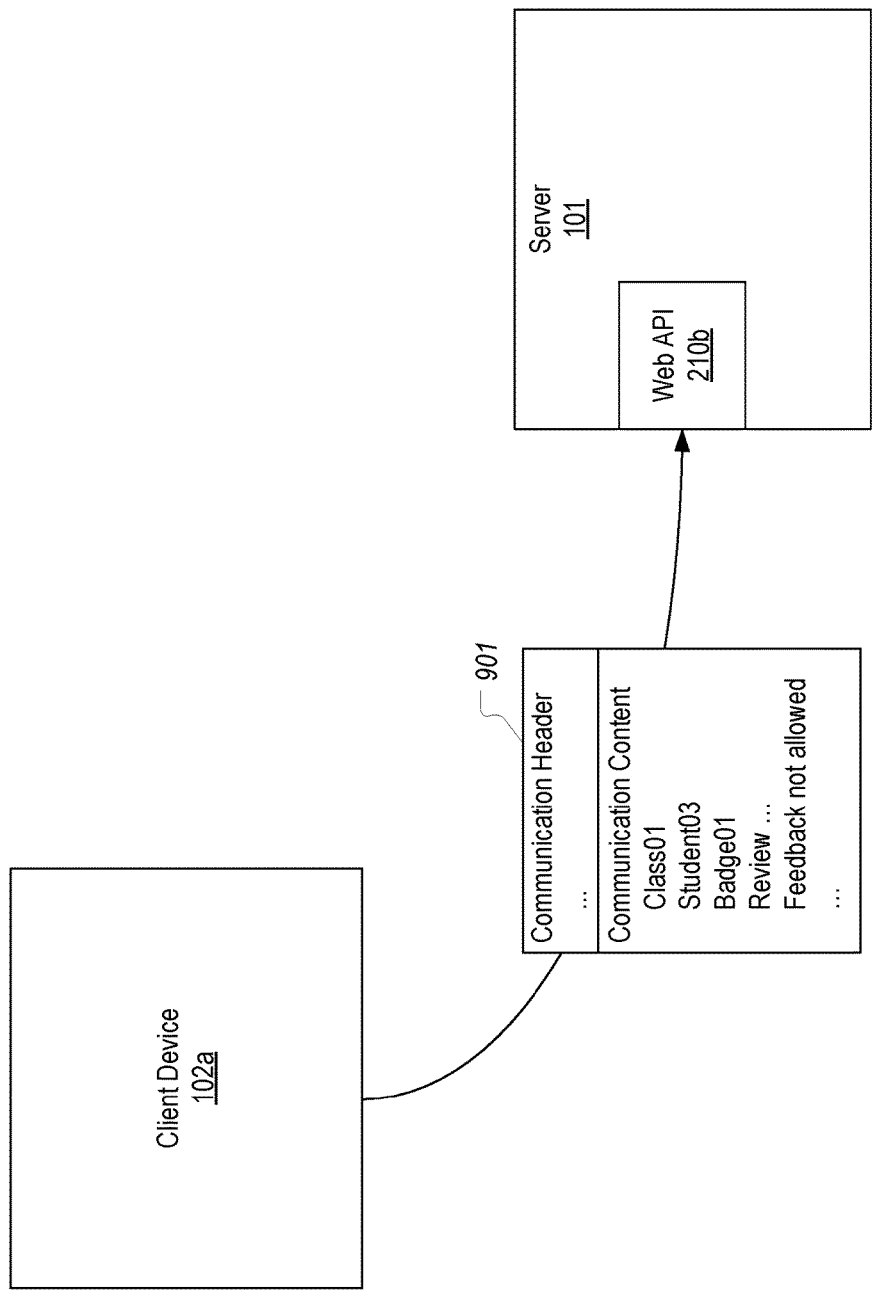
FIGS. 9A-9D illustrate a similar process as shown in FIGS. 5A, 5B, 7A, and 7B but in the context of a challenge that is associated with a badge.

In response, a communication 901 can be sent to server 101 via web API 210b as is shown in FIG. 9A. Communication 901 is similar to communication 501 but includes content specific to the challenge to be issued to Cecila. In particular, communication 901 includes Class01 (for Keith Hunt's English class), Student03 (for Cecila), Badge01 (which is assumed to be the identifier for the Another Go badge), the task "Review . . . ," and an indication that feedback is not allowed, among possibly other content.

Figure 9B:
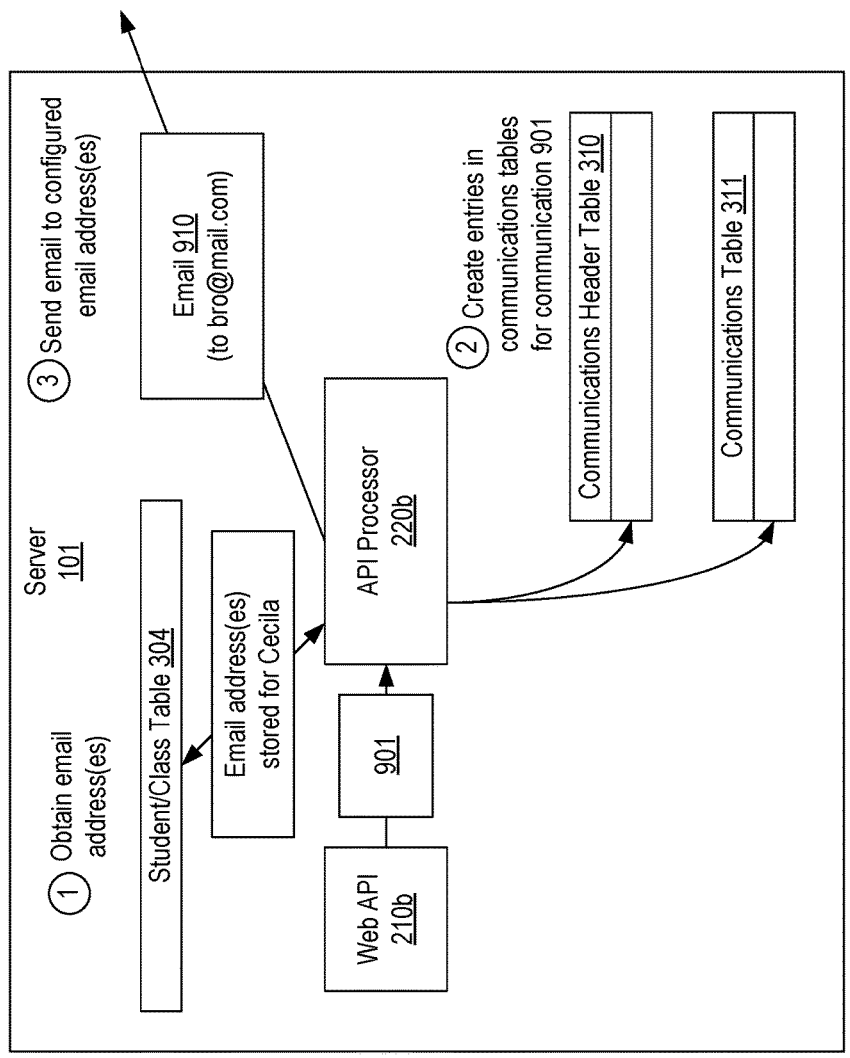
Figure 9C:
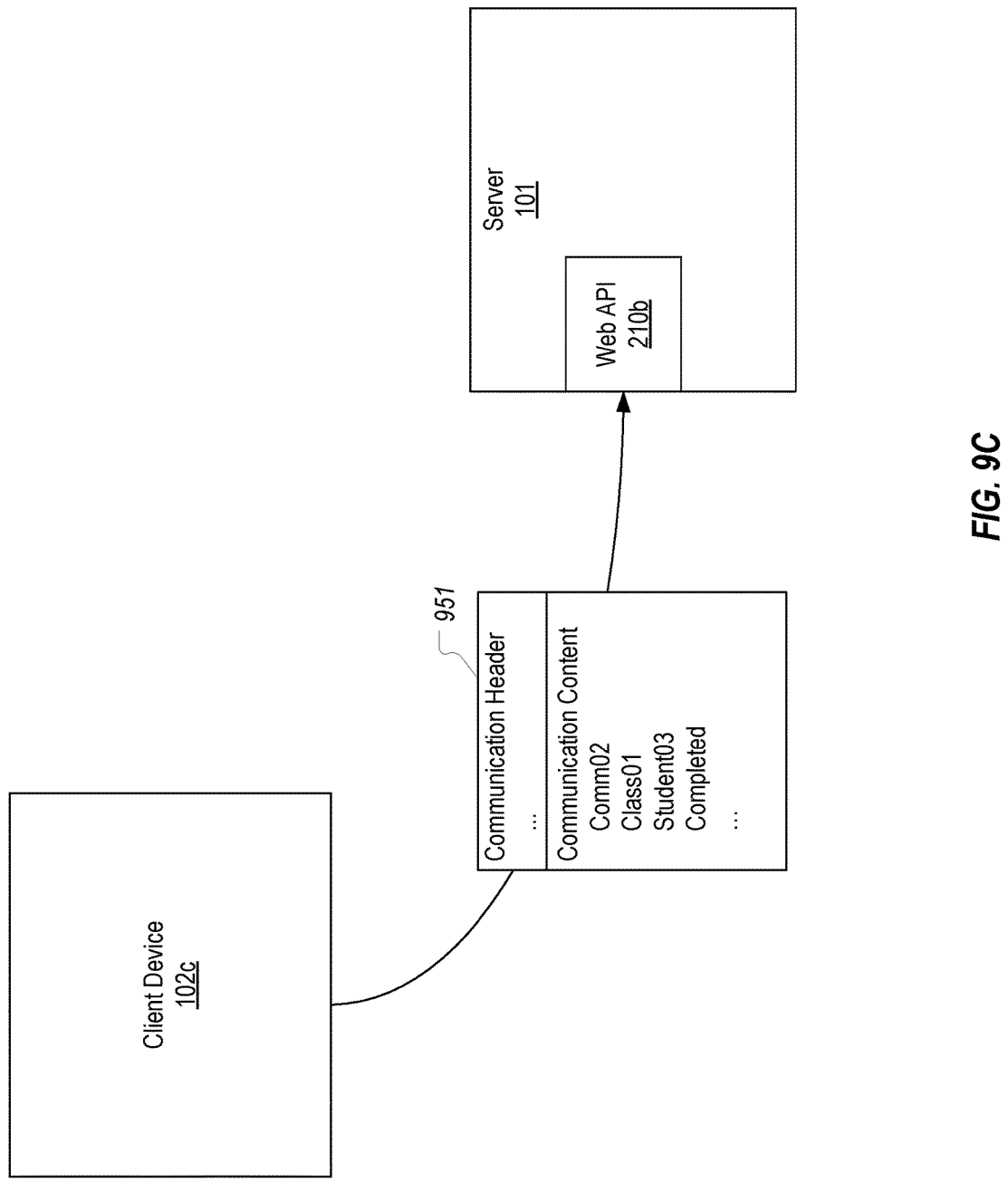

As shown in FIG. 9B, a process similar to the process in FIG. 5B can be performed in response to API processor 220b receiving communication 901. This can include identifying the email address(es) registered for Cecila in the English class, creating entries in communications header table 310 and communications table 311, and sending an email 910 to bro@mail.com (which is the email address registered for Cecila in student/class table 304). For example, in FIG. 3C, communications header table 310 includes an entry indicating that Keith Hunt issued a challenge in his English class on Jun. 9, 2016 that would award a badge having a BadgeID of Badge01 and that should not allow feedback. As shown in FIG. 3B, it is assumed that badges are not associated with points and therefore the entry includes null in the points field to indicate that no points will be awarded in conjunction with the award of the badge. Also, communications table 311 includes an entry for Class01, Student03, Comm02 (the identifier that is assumed to have been created for this challenge), and bro@mail.com. As indicated above, the status would initially be set to pending in spite of what is shown in FIG. 3C.

Email 910 can be substantially similar to email 510 and therefore an example of its contents will not be shown. However, it can be assumed that Cecila's approver selects the Yes button in the email which causes a communication 951 to be sent from client device 102c (which is assumed to be the computing device employed by the approver) to server 101 via web API 210b. Communication 951, like communication 701, can include a CommID (Comm02), a ClassID (Class01), a StudentID (Student03), and an indication that the Yes button was selected.

Figure 9D:
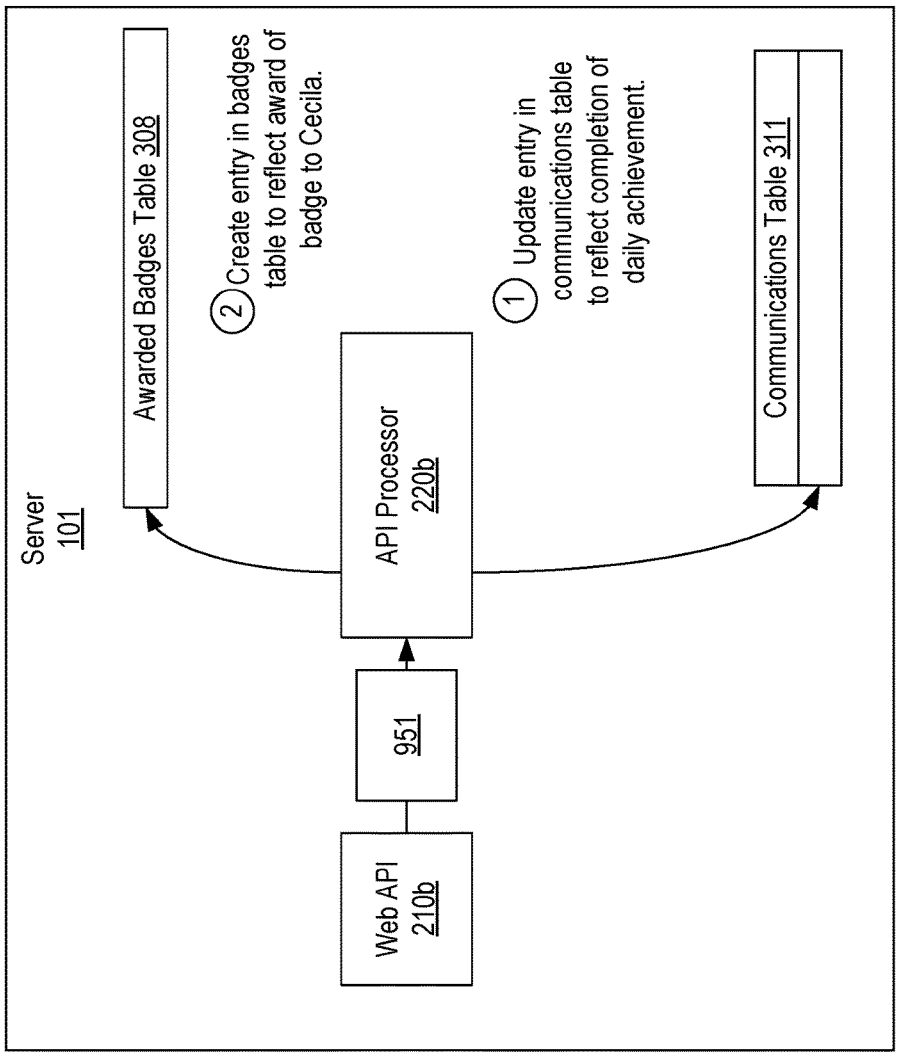

As shown in FIG. 9D, in response to receiving communication 951, API processor 220b can update the entry in communications table 311 to indicate that Cecila completed the challenge and can also create an entry in awarded badges table 305 to indicate that the Another Go badge has been awarded to Cecila. For example, referring to FIG. 3B, awarded badges table 305 includes an entry defining that the badge with a BadgeID of Badge01 was awarded to Student03 in Class01.

In this way, teachers from a number of different classes can recognize and reward students for completing challenges (or daily achievements). Also, as indicated above, teachers can award achievements to students directly rather than as part of a challenge. In either case, the teachers can employ teacher website 210a to quickly and easily create challenges and/or award achievements. Although not described in detail, it is to be understood that the other types of achievements (e.g., skills and rewards) can be awarded in much the same way as described above including by directly awarding them to a selected student or by making their award contingent on completion of a challenge.

The architecture of the communications platform allows this type of recognition and reward system to be implemented in a user-friendly yet scalable way. For example, by employing multi-tenant database(s) 201 to implement each of the described tables, virtually any number of schools or other organizations (i.e., tenants) can be concurrently managed by the communications platform. The structure of the various tables allows this management to be performed in a streamlined and scalable fashion.

Returning to FIG. 2, each tenant/customer (e.g., each school, district, or organization) can be assigned a dedicated customer database for the purpose of storing the data from multi-tenant database 201 that pertains to that tenant. A primary reason for employing a dedicated customer database is to facilitate the provision of a dashboard or other reporting tools. In other words, a dedicated customer database can be employed to segregate a school's data from the data of all other users of the communications platform to allow reporting to be performed in an efficient manner.

As was described above, database sync process 220a can be tasked with synchronizing a school's data from multi-tenant database 201 to the corresponding dedicated customer database. The exact process for synchronizing this data will not be described in detail herein. Suffice it to say that database sync process 220a can employ the ClassIDs of classes associated with the school to identify and retrieve records that pertain to the school.

Figure 10A:
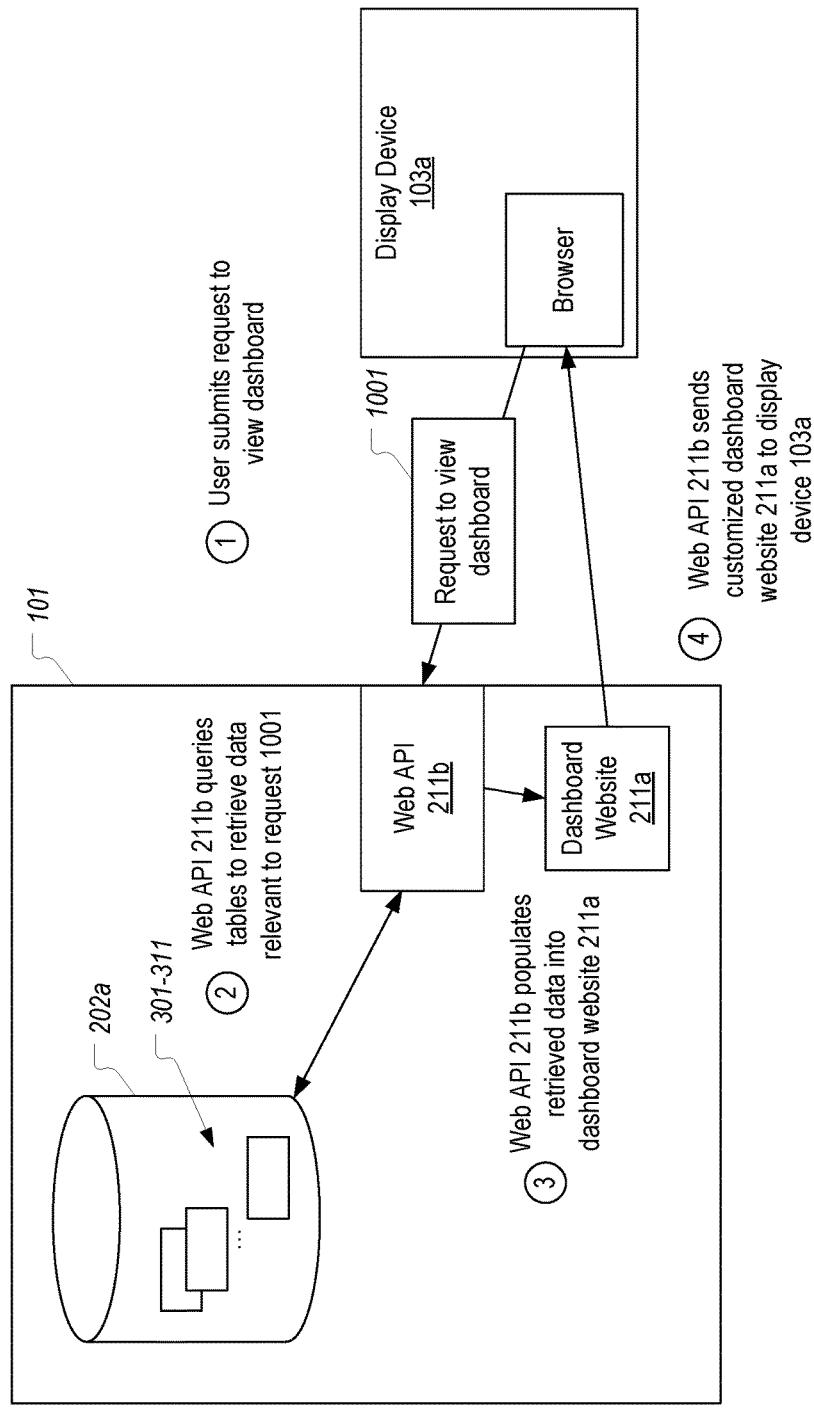
FIGS. 10A and 10B illustrate an example of a process by which the communications platform generates a dashboard view of students' achievements.
Figure 10B:
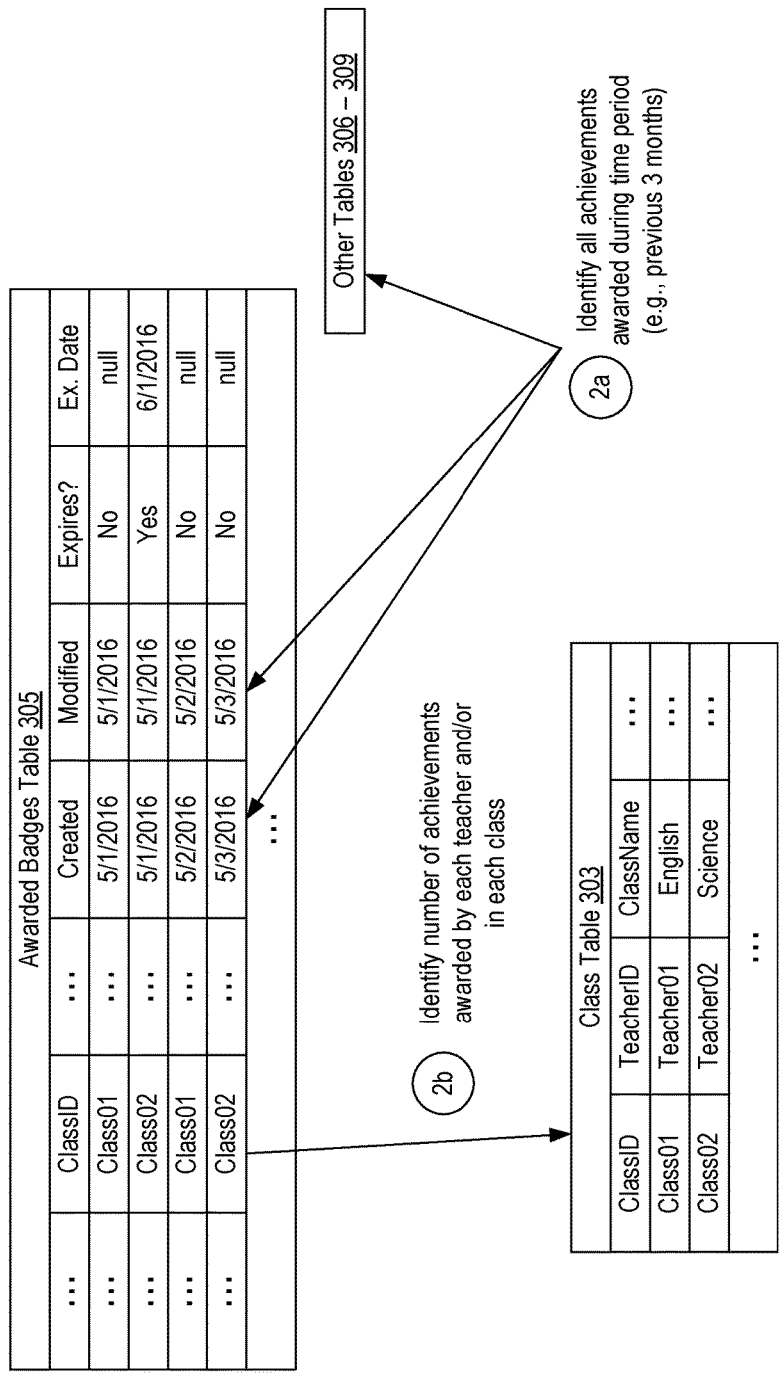

FIGS. 10A and 10B illustrate an example of the processing that the communications platform can perform to generate and display a dashboard representing achievements that students at a particular school have received. For purposes of this example, it will be assumed that the school's data is synchronized to dedicated customer database 202a. It will also be assumed that the portions of tables 301-311 shown in FIGS. 3A-3C include only entries pertaining to the school. Therefore, the synchronized versions of tables 301-311 in dedicated customer database 202a can include the same entries as shown in FIGS. 3A-3C. However, it is to be understood that the contents of dedicated customer database 202a would typically be a very small subset of the contents of multi-tenant database 201.

As shown in FIG. 10A, in a first step, a display device 103a (which can be any computing device with an internet connection and a browser or other suitable software for displaying a dashboard) submits a request 1001 to server 101 via web API 211b to view a dashboard. For example, this could be accomplished by navigating to dashboard website 211a and providing appropriate input to dashboard website 211a (e.g., by logging in to dashboard website 211a with credentials associated with the school or otherwise providing input identifying the school). In such cases, dashboard website 211a can be configured to create request 1001 and submit it to web API 211b.

Upon receiving request 1001 and in a second step, web API 211b can create appropriate queries to access the appropriate dedicated customer database and to obtain the relevant information for generating the requested dashboard. For example, request 1001 can include an identifier of the school or an identifier associated with the school which web API can employ to identify that dedicated customer database 202a should be queried (as opposed to any of the many other dedicated customer databases). In some embodiments, these queries can be configured to retrieve information about which achievements have been awarded during a specified amount of time as will be further described below.

In a third step, web API 211b receives the query results and populates the results into a dashboard webpage of dashboard website 211a. For example, dashboard website 211a can be configured to display awarded achievements in accordance with a number of different formats. Finally, in a fourth step, with dashboard website 211a appropriately configured, web API 211b can return the customized version of dashboard website 211a to display device 103a for display.

FIG. 10B illustrates a more detailed example of how the relevant information can be retrieved from dedicated customer database 202a in response to request 1001. In a step 2a, queries can be configured to retrieve any achievements that have been awarded during a specified amount of time (e.g., within the past 3 months). For this purpose, each achievement table 305-309 can include a column defining a created (or modified date) which defines when the entry was created (or modified) thereby indicating when the corresponding achievement was awarded. Accordingly, FIG. 10B represents that queries are generated to identify each entry in tables 305-309 that includes a created (or modified) date within the specified time period.

In step 2b, after identifying which achievements were awarded during the time period, queries can be submitted to identify which teacher was the source of the awarded achievement and to identify the class in which it was awarded (e.g., by using the ClassID in each entry in an achievement table (305-309) to query class table 303 for the TeacherID and ClassName values). With this information, web API 211b can generate a dashboard that represents the total number of achievements that were awarded in the school, the number that were awarded during specific time intervals (e.g., each week), the number that were awarded in a particular class, the number that were awarded by a particular teacher, the number of each type of achievement that were awarded, etc. The use and structure of dedicated customer database 202a allows such a dashboard to be created in a streamlined and scalable manner.

Figure 11:
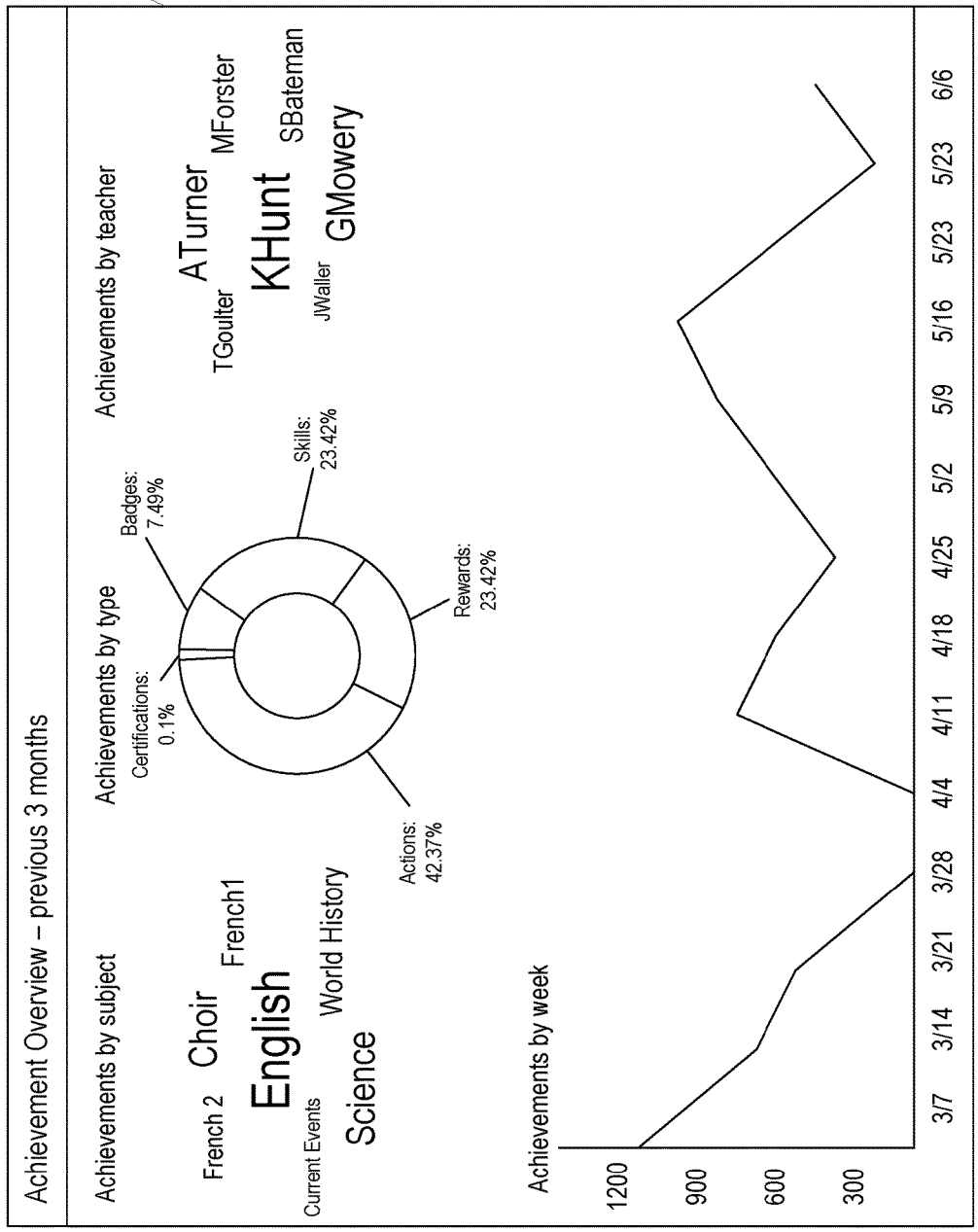
FIG. 11 illustrates an example dashboard.

Turning to FIG. 11, an example dashboard 1100 is shown that is based partially on the example data of tables 301-311. Dashboard 1100 represents achievements that have been awarded in a particular school (i.e., the school where Keith Hunt teaches English) during the previous 3 month period. Dashboard 1100 includes an "Achievements by subject" area, an "Achievements by type" area, an "Achievements by teacher" area, and an "Achievements by week" area. By employing the ClassID associated with each awarded achievement, the total number of achievements awarded in a particular class can be obtained. In this example, dashboard 1100 displays classes with more achievements in larger font than those with fewer achievements. A similar display technique is employed for the Achievements by teacher area. Again, using the ClassID, class table 303 can be queried to obtain the name of each class in which achievements were awarded and then each class name can be displayed with a size representing the number of achievements awarded in that class.

The Achievements by type area can represent how many of each type of achievement was awarded. For example, web API 211b can identify the total number of achievements as well as the number of each type of achievement and use these numbers to calculate what percentage of total achievements a particular type of achievement represents. This information can then be displayed in the Achievement by type area such as in the depicted donut chart format. Finally, the Achievements by week area can comprise a graph of the number of achievements awarded in the school each week.

In some embodiments, various elements of dashboard 1100 can be selectable to allow more detailed information to be obtained. For example, the word "English" in the Achievements by subject area could be selected to cause a request to be sent to web API 211b to obtain additional information about the achievements that were awarded in the English class. In response, web API 211b could query tables 305-309 for any entries having the ClassID of the English class (Class01). The results of these queries could then be processed and combined into a format that can be displayed within dashboard 1100. For example, dashboard 1100 could be updated to indicate how many of each type of achievement was awarded in the English class, which specific achievements were awarded, which students received these achievements, etc.

Similarly, by selecting a portion of the donut chart, appropriate queries can be performed to obtain additional information regarding the type of achievement selected (e.g., a number of achievements awarded in each class, by each teacher, to each student, etc.). Other elements of dashboard 1100 could equally be selected to obtain additional information in a similar manner.

In some embodiments of the present invention, the communications platform can be used to implement group competitions within a recognition and rewards system. The structure of the communications platform and, more specifically, the structure of multi-tenant database 201, facilitates establishing such group competitions.

To implement group competitions in a streamlined and scalable manner, some of the previously described tables within multi-tenant database 201 can be employed to define the various groups as well as membership in a group. In particular, class table 303 can be employed to define a group competition, student/class table 304 can be employed to define a student's involvement in a particular group competition, and awarded badges table 305 can be employed to define to which group within a particular group competition a student belongs.

FIG. 12 provides an example of how entries in tables 303-305 can be created to define a group competition. It is noted that tables 303-305 can be used as described above (i.e., to define classes, membership in classes, and badges that have been awarded to students in classes) even when these same tables are also used to define and implement group competitions. In this manner, the communications platform provides a scalable solution for implementing a recognition and rewards system.

As shown in FIG. 12, class table 303 includes an entry defining a group competition in addition to the two entries defining the English and Science classes described above. This group competition entry includes a ClassID, which in this example is Comp01 to better clarify that it pertains to a group competition rather than a class, and a ClassName, which in this example is $3^{rd}$ Grade to indicate that the group competition involves students in the $3^{rd}$ grade. Although not shown, this entry can also include a TeacherID to define a teacher/administrator that may oversee the group competition.

To define a student's involvement in a group competition, an entry can be created in student/class table 304. For example, in FIG. 12, student/class table 304 is shown as including four entries that each include a ClassID of Comp01 thereby indicating that these entries define a student's involvement in the group competition with a ClassID of Comp01. As with entries defining inclusion in a class, these entries defining inclusion in a group competition also include the student's UserID and can include the student's name and other information as described above. Accordingly, student/class table 304 indicates that Alyssa Mayer, Brian McGavin, Cecila Cardenas, and Eli Worthington are all participants in the same group competition. Of course, an actual instance of student/class table 304 would typically include a very large number of entries pertaining to a large number of classes and/or group competitions. FIG. 12 therefore only provides a very simple example.

As mentioned above, student/class table 304 does not identify to which group a student in a group competition belongs. Instead, awarded badges table 305 can be used for this purpose. When a group competition is configured, a unique badge can be defined for each group in the competition. Although not shown, a separate table which defines badges including their characteristics could be employed for this purpose. Then, to assign a particular student to a particular group within the group competition, the badge defined for that group can be awarded to the student. For example, in FIG. 12, it will be assumed that a badge with a BadgeID of Badge10 has been defined for a first group in the Comp01 group competition while a badge with a BadgeID of Badge11 has been defined for a second group. For simplicity, it will be assumed that only two groups exist in this example group competition.

In FIG. 12, awarded badges table 305 includes entries identifying that Badge10 has been awarded to Alyssa Mayer (Student01) and to Brian McGavin (Student 02) in the context of the group competition (Comp01) while Badge11 has been awarded to Cecila Cardenas (Student03) and to Eli Worthington (Student04). Therefore, by accessing student/class table 304, it can be determined that these four students are participants in the group competition and then by accessing awarded badges table 305, it can be determined that Alyssa and Brian belong to one group while Cecila and Eli belong to another.

With this structure in place, the group competition can be seamlessly implemented based on achievements that the participants receive in their classes. In other words, a group competition can be configured to employ achievements received by students in their classes as the basis for awarding group points. The structure of the communications platform therefore allows group competitions to be seamlessly implemented with little to no additional overhead from the teachers', students', or parents' perspectives.

In order to track when an achievement has been awarded to a participant in the group competition, the communications platform can be configured to allow an administrator to create a webhook that will cause a notification to be sent to the group competition website whenever an achievement is awarded within a class that is associated with the group competition. In other words, one or more classes can be associated with a group competition so that achievements received by some or all of the students in those classes will be reported to the group competition website for purposes of generating group points.

Figure 13A:
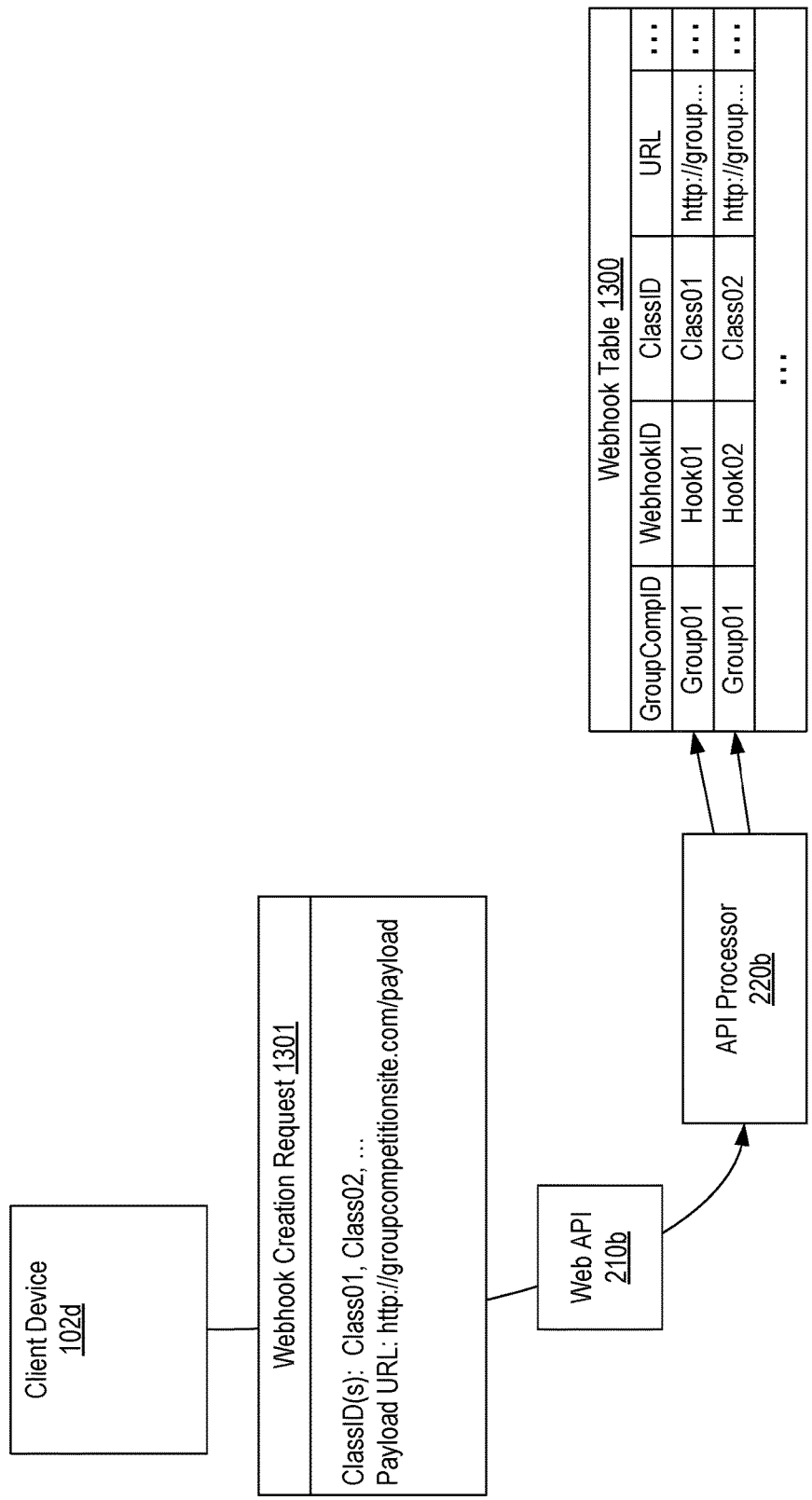
FIGS. 13A and 13B illustrate an example of a process by which the communications platform identifies awarded achievements that pertain to a particular group competition and reports the identified achievements to a group competition website.

FIG. 13A illustrates an example of how a webhook can be employed to associate a particular class or classes with a group competition. An administrator or other authorized user can be allowed to submit a request to create a webhook to the communications platform to thereby cause the award of achievements in one or more classes to be reported to the group competition website. In FIG. 13A, it is assumed that an administrator is employing client device 102*d* to submit a webhook creation request 1301. For example, the administrator may visit a webpage that is configured to receive input for requesting the creation of a webhook and that generates, based on such input, webhook creation request 1301 for submission to server 101 via web API 210*b*.

In FIG. 13A, it is assumed that Keith Hunt's English class and Greg Mowery's Science class are desired to be associated with the group competition and therefore webhook creation request 1301 includes ClassIDs Class01 and Class02. Webhook creation request 1301 also includes a payload URL which defines where server 101 should send webhook payloads that are generated when an achievement is awarded in the identified classes.

As shown, webhook creation request 1301 can be routed to API processor 220*b* which can process the request to create corresponding entries in a webhook table 1300. Webhook table 1300 defines webhooks that have been created by associating a ClassID with a payload URL. Webhook table 1300 may also include an identifier of the group competition to which the webhook pertains and a webhook identifier to facilitate management of created webhooks. Once entries are created in webhook table 1300, these entries can be accessed when an achievement is awarded to determine whether a webhook payload should be generated to report the award.

Figure 13B:
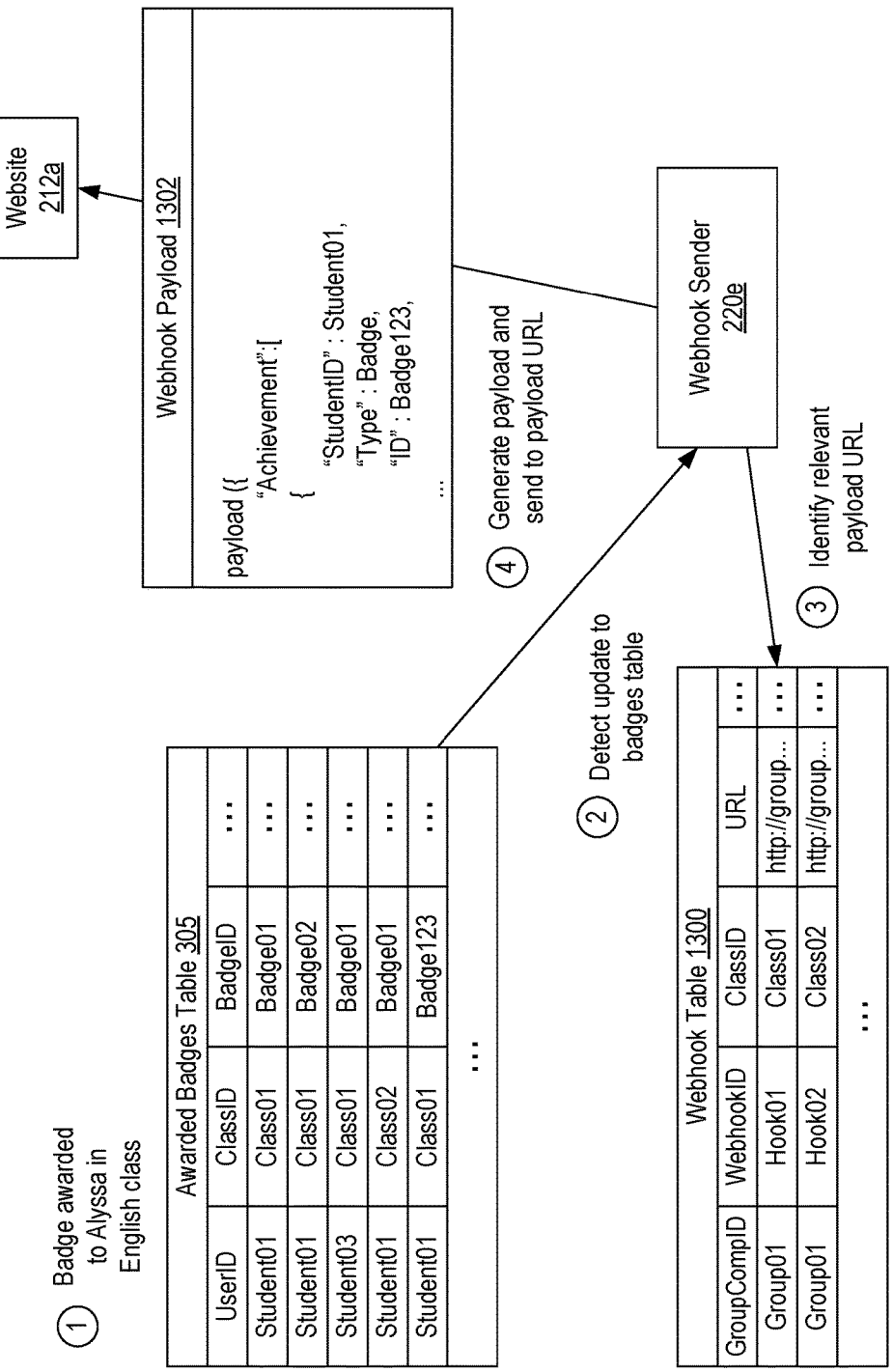

FIG. 13B illustrates an example of how the award of an achievement in a class associated with a group competition can be reported. Although this example will employ the award of a badge, the same process can be performed when other types of achievements are awarded. In a first step, it will be assumed that Alyssa Mayer is newly awarded a badge having a BadgeID of Badge123 in Keith Hunt's English class as represented by the fifth entry in awarded badges table 305. Webhook sender process 220*e* can be configured to monitor for updates to awarded badges table 305 (as well as for updates to the other achievement tables 306-309), and, in response to such updates, can identify in which class the achievement was awarded and whether any webhook has been created for this class. For example, in a second step, webhook sender 220*e* identifies the addition of the fifth entry in awarded badges table 305, and then, in a third step, can employ the ClassID in the fifth entry (Class01) to query webhook table 1300 for any matching entries. In this case, webhook sender 220*e* will identify an entry that maps Class01 to the payload URL: http://group-competitionwebsite/payload. Of course, there could be other entries that map Class01 to other payload URLs such as would be the case when this class is (or at least its students are) participating in a number of different group competitions.

Accordingly, because webhook sender 220*e* has determined that an achievement has been awarded in a class for which a webhook has been created, it can generate and send a webhook payload 1302 in a fourth step. Webhook sender 220*e* can be configured to obtain the necessary information for identifying the achievement that was awarded and the student to which it was awarded along with possibly the class in which it was awarded. For example, webhook payload 1302 is shown as including JSON formatted data defining the award of an achievement of type "Badge" having an ID of Badge123 to a student having an ID of Student01. Although not shown, webhook payload 1302 could include an identification of more than one awarded achievement. For example, webhook sender 220e could be configured to scan the achievement tables on a periodic basis (e.g., hourly) to identify all achievements that have been awarded during the previous interval and can then generate a webhook payload that identifies each of these awarded achievements (whether those from a single class or from all classes associated with the same payload URL). Alternatively, webhook sender 220e could be configured to send webhook payload(s) in response to a request from group website 212a (e.g., via web API 212b). For example, whenever a user accesses group website 212a, the website could issue a request to receive a webhook payload or payloads to allow the website to update the group competition.

In this manner, group website 212a can seamlessly receive notification of any achievements the participants in the group competition have received in the associated classes. Group website 212a can then be configured to apply any possible set of rules for awarding group points based on these awarded achievements. For example, for each badge received by a member of a particular group, that group's point total may be incremented by 5. Similarly, actions, certifications, skills, rewards, etc. may be given a specified value for purposes of calculating a group's points. In some embodiments, a more granular point calculation scheme may be employed. For example, 5 points may be awarded for one type of badge while only 4 or 3 points may awarded for other types of badges. Also, for achievements that have incrementing levels (e.g., skills as shown in FIG. 3B or any other type of achievement), a greater amount of group points may be awarded for higher level achievements. In some embodiments, group points may be deducted for negative achievements. For example, if a badge is lost or revoked, a specified amount of group points may be deducted.

As can be seen, a group competition with virtually any point calculation structure can be created by configuring the group competition website to perform these calculations based on the achievements that are reported through the above-described mechanisms. This structure provides greater flexibility to the administrator of the group competition while abstracting the underlying achievement awarding and reporting processes.

Figure 14:
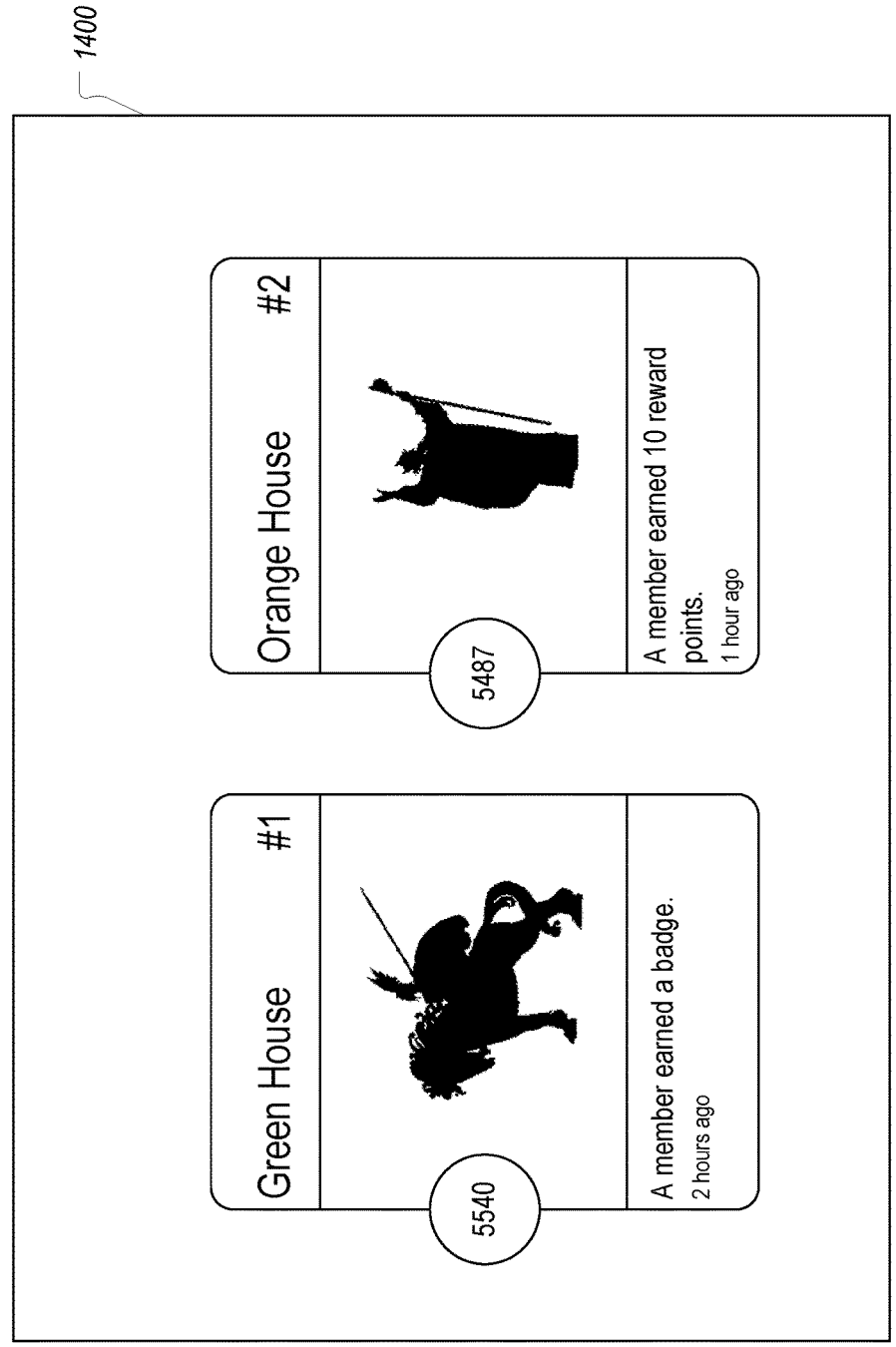
FIG. 14 illustrates an example of a group competition dashboard.

FIG. 14 provides an example of a group competition dashboard 1400 that can be generated by group web site 212a to display the number of points received by each group in the group competition. In this example, it will be assumed that only two groups (Group01 and Group02) are defined within the group competition. Dashboard 1400 can include a display for each group whose contents may be based on the badge assigned to that group. For example, Badge10 may be defined to include the image of the warrior on horseback and the group name of "Green House," while Badge11 may be defined to include the image of the wizard and the group name of "Orange House." Dashboard 1400 also indicates that the group Green House has received 5540 group points while the group Orange House has received 5487. In some embodiments, dashboard 1400 may also include an indication of recent achievements that have been awarded to members of the group.

Dashboard 1400 can be displayed on any suitable display device (e.g., display device 103a which includes a browser for accessing group website 212a). Dashboard 1400 can be displayed on a display device that is located in a common area at a school, workplace, or other environment where the participants in the group competition can view it. This can incentivize and encourage participation in a recognition and rewards program. Additionally, dashboard 1400 can be made available for display on any computing device such as, for example, in response to a participant or a participant's parent or guardian providing suitable credentials.

In summary, the communications platform can integrate the group competition functionality into the other mechanisms for implementing a recognition and rewards program. The structure of the communications platform makes this possible in a seamless fashion that can be scaled for concurrent use in many different schools, workplaces, or other environments.

In some embodiments of the present invention, the communications platform can enable traits to be allocated to students based on achievements that have been awarded to the students. More particularly, achievements can be associated with one or more traits as well as an adjustment value for each trait. Then, when an achievement has been awarded to a student, the achievement's trait(s) and adjustment value(s) can employed when calculating traits of the student.

FIG. 15 illustrates how the communications platform can implement this functionality using badges as an example of achievements that are associated with traits. It is noted, however, that any other type of achievement could be associated with one or more traits in a similar manner as described below. In FIG. 15, a badges table 1501a and a badge traits table 1501b are depicted. Badges table 1501a can be employed to define badges that are available to be awarded to students. Accordingly, entries in badges table 1501a can include a BadgeID, a BadgeName, and possibly many other fields (e.g., a description of the badge, an icon for the badge, an expiration date, an identification of days of the week on which the badge can be awarded, etc.).

A separate badge traits table 1501b can also be employed to define each trait associated with a badge. As shown, entries in badge traits table 1501b can include the BadgeID (to identify to which badge the entry pertains), an identification of the trait to be associated with the badge, and an adjustment value assigned to the trait among possibly many other fields. An entry may be made in badge traits table 1501b for each trait associated with a badge such that multiple entries may exist for a single badge. For example, the Another Go badge having a BadgeID of Badge01 includes two entries in badge traits table 1501b defining that the coachability trait and the grit trait are associated with the Another Go badge. These entries also define an adjustment value of 1 for each of these two traits. The adjustment value defines how much a student's corresponding trait should be incremented if the badge is awarded to the student. A similar structure could be employed for other types of achievements. For example, in the case of certifications, a certification table and a certification traits table could be defined.

One benefit of employing a separate data structure for defining an achievement's traits is that it allows the calculation of a student's traits to be done dynamically (i.e., on demand) in an efficient manner and does not require maintaining such information in the student's profile (e.g., within student table 301) which would otherwise require substantial processing overhead whenever a badge's traits were updated. Also, employing a traits table separate from the achievement table facilitates associating a different number of traits with different achievements.

Figure 16A:
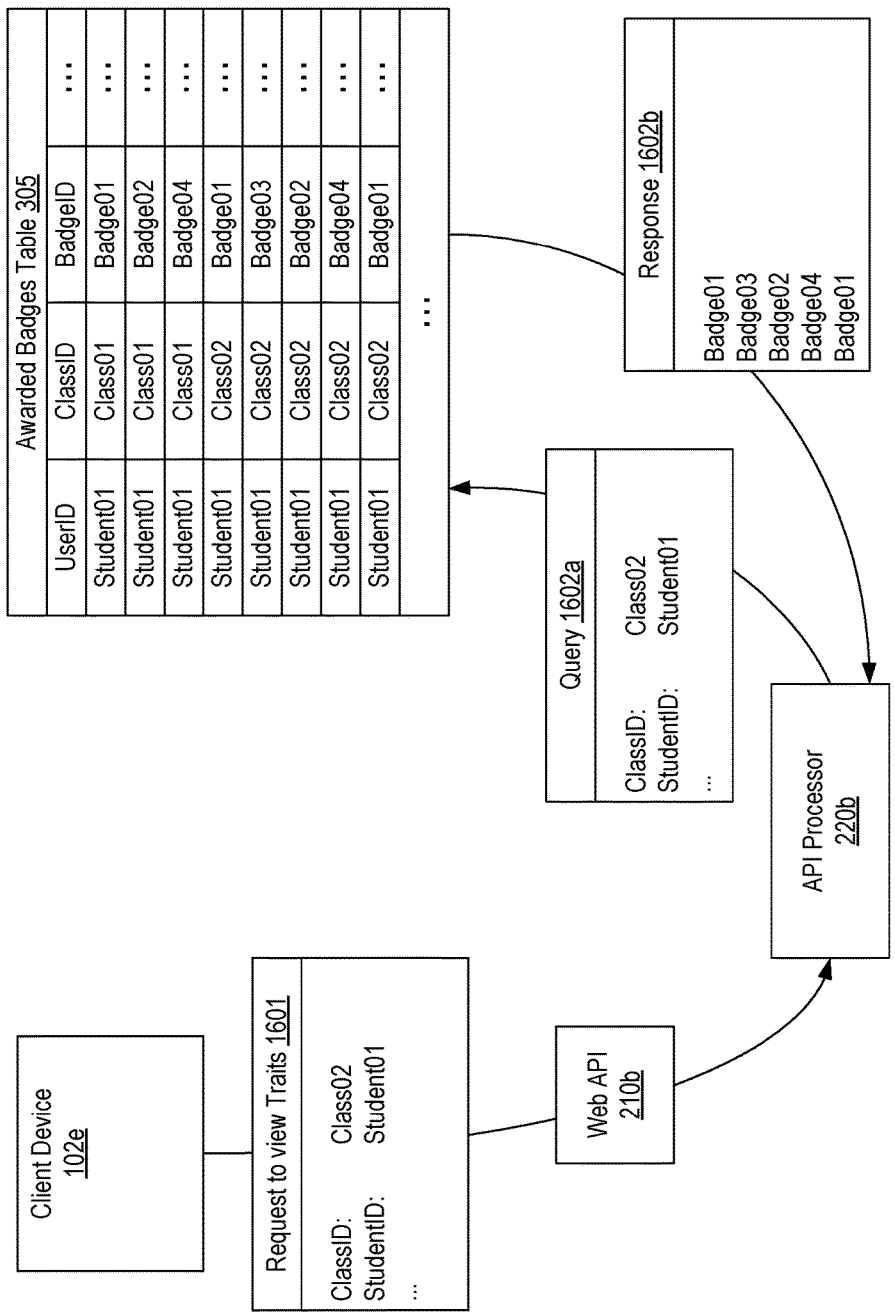
Figure 16B:
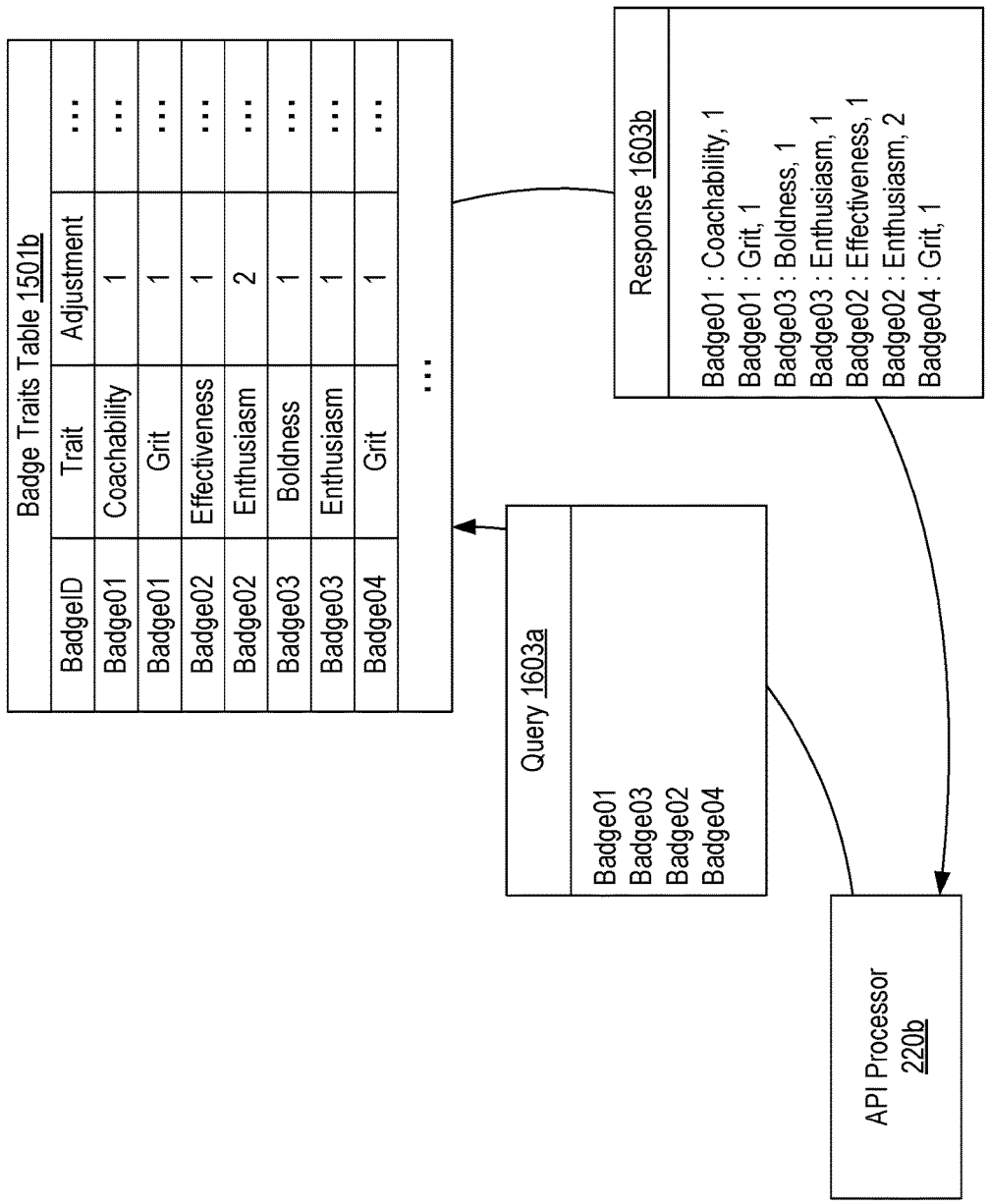

FIGS. 16A-16C provide an example of how the communications platform can dynamically calculate a student's traits based on which badges have been awarded to the student. As shown, awarded badges table 305 is assumed to include a number of entries identifying badges that Alyssa Mayer has received in her English and Science classes.

In FIG. 16A, it is assumed that a request 1601 is submitted via web API 210b to view Alyssa's traits within Greg Mowery's Science class. For example, Greg Mowery may select Alyssa's profile from within teacher website 210a that he is viewing on client device 102e. Request 1601 can include an identification of the Science class (Class02) as well as an identifier of the selected student (Student01). Request 1601 can be passed to API processor 220b which will then generate a query 1602a based on the contents of request 1601. As shown, query 1602a can target awarded badges table 305 and can include Class02 and Student01 as parameters. In response to query 1602a, a response 1602b will be generated that includes an indication of each badge that has been awarded to Alyssa Mayer in Greg Mowery's Science class (i.e., the BadgeID of every entry matching the Student01/Class02 parameters will be returned).

Turning to FIG. 16B, upon receiving response 1602b, API processor can generate a query 1603a that targets badge traits table 1501b and includes each BadgeID specified in response 1602b. In this example, query 1603a will therefore include Badge01, Badge03, Badge02, and Badge04. The intent of query 1603a is to retrieve any trait and corresponding adjustment that is assigned to the badges that Alyssa Mayer has received in the Science class. Accordingly, response 1603b will include a listing of these traits and adjustments as shown.

Upon receiving the trait(s) and adjustment(s) associated with each badge, API processor 220b can then calculate a value for each identified trait. As shown in FIG. 16C, API processor 220b can identify each trait that Alyssa Mayer has been awarded and can also sum the adjustments for each trait. For example, because Alyssa was awarded the Another Go badge (Badge01) twice, her coachability trait will be assigned a value of 2. Similarly, because Alyssa received the Another Go badge twice and the Hard Work badge once, her grit trait will be assigned a value of 3. In this way, Alyssa's traits and corresponding values or levels can be calculated on demand.

Figure 17:
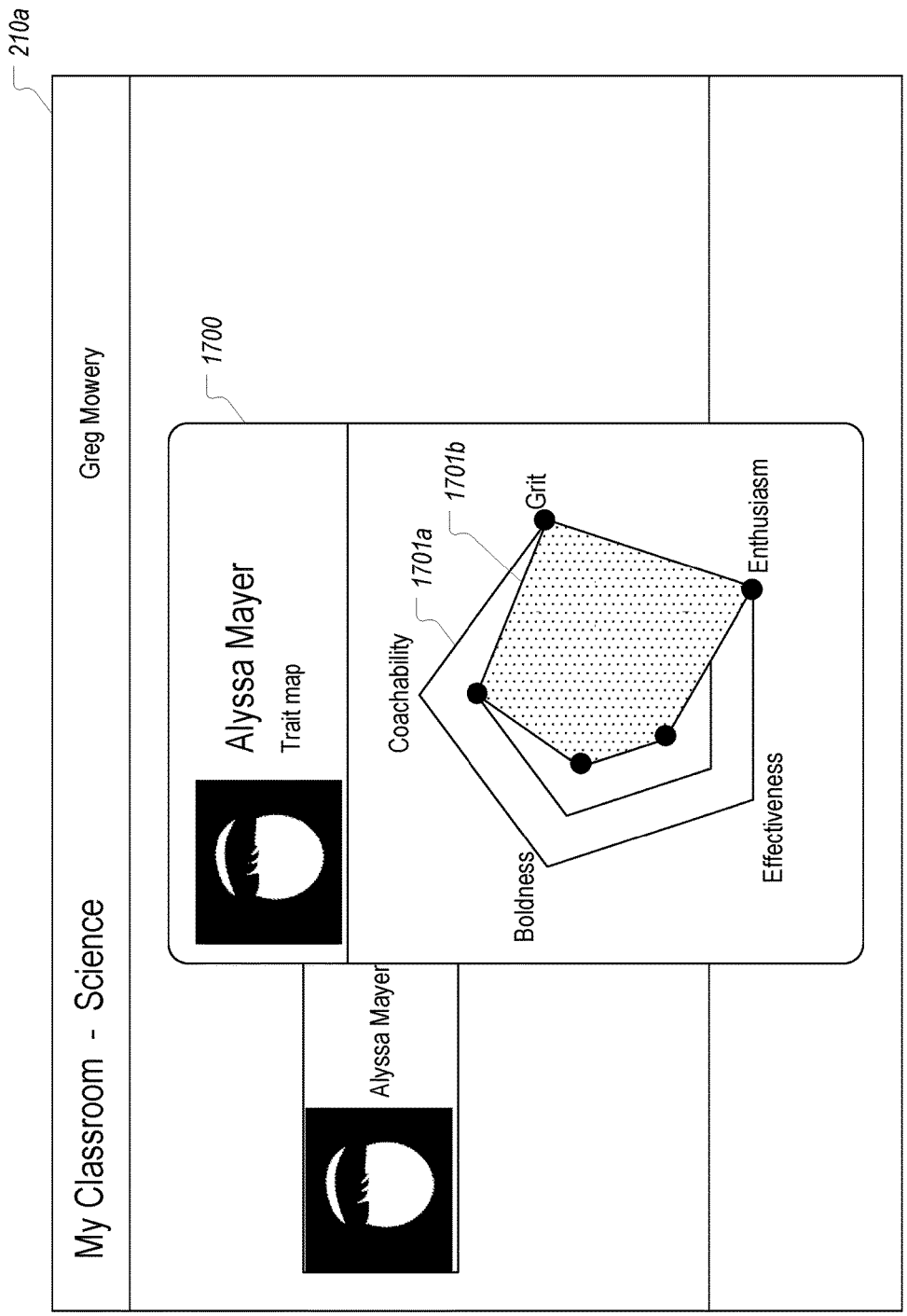
FIG. 17 illustrates an example of how a student's traits and trait values, which were calculated by the communications platform, can be represented to a teacher, parent, student, or other individual.

With Alyssa's traits calculated, these traits can then be displayed. FIG. 17 illustrates an example of how Alyssa's traits can be displayed within teacher website 210a. As shown, a window 1700 can be presented (e.g., upon selecting Alyssa's picture) which displays her traits in a trait map format. This trait map format can comprise an equilateral shape 1701a having a vertex for each trait that has been assigned (or awarded) to the student. Then, to represent the level or score of each trait, an overlay 1701b can be employed. The overlay can also be a shape having a vertex for each trait, but each vertex can be positioned on shape 1700 in accordance with the level of the corresponding trait. For example, because the grit and enthusiasm traits have a score of 3 (which is also the maximum score for any of Alyssa's traits), the grit and enthusiasm vertices in overlay 1701b are positioned overtop the grit and enthusiasm vertices of shape 1701a. In contrast, the vertices for the remaining coachability, boldness, and effectiveness traits can be positioned in accordance with the scores of 2, 1, and 1 respectively. This trait map can therefore provide a quick reference for identifying a student's traits.

As mentioned above, the structure of communications platform allow traits to be tracked and reported in an efficient and scalable manner. For example, if it were desired to update a badge's traits and/or adjustments (e.g., to add a third trait to the Another Go badge or to change the adjustment of the coachability or grit trait assigned to the Another Go badge), such changes could be made directly to badge traits table 1501b without needing to make updates in other data structures including any data structure used to store the traits of an individual student. Any changes made to badge trait table 1501b would automatically be reflected whenever a student's traits are subsequently calculated and displayed. In contrast, if the traits or trait values assigned to a particular student were stored in the student's profile and a change was made to a badge's traits on which the student's traits or trait values were based, it would be necessary to also update the student's profile (as well as the profile of any other student whose traits or trait values were based on that badge). This would lead to a large amount of processing and would limit the scalability of the communications platform. In short, the structure and technique employed by the communications platform to assign traits and trait values to students provides an efficient and scalable solution.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A communications platform for enabling the implementation of a recognition and rewards system, the communications platform comprising at least one server having the following components:
   one or more databases that define a number of data structures including:
      a student/class data structure which stores entries each of which defines a particular class of a plurality of classes to which a particular student of a plurality of students belongs as well as at least one communication address for the particular student; and
      one or more achievement data structures, each achievement data structure storing entries each of which defines an achievement that has been awarded to a particular student of the plurality of students in a particular class of the plurality of classes;
   an API processor configured to:
      receive communications each of which identifies an award of an achievement to a particular student of the plurality of students in a particular class of the plurality of classes; and
      in response to receiving each communication, create an entry in the one or more achievement data structures to define the award of the achievement that is identified in the communication to the particular student that is identified in the communication in the particular class that is identified in the communication; and
   a dashboard website and web API that are configured to query the one or more achievement data structures to retrieve and display award information pertaining to a particular organization.

2. The communications platform of claim 1, wherein the organization is a school and the award information comprises a number of achievements that have been awarded to students within each of a number of classes at the school.

3. The communications platform of claim 2, wherein the award information comprises an indication of a number of each of a plurality of types of achievements.

4. The communications platform of claim 2, wherein the award information comprises an indication of a total number of achievements that have been awarded to students in a plurality of classes at the school.

5. The communications platform of claim 1, wherein each entry in the one or more achievement data structures includes an identifier of an achievement that was awarded, an identifier of a student to which the achievement was awarded, and an identifier of a class in which the achievement was awarded, and wherein querying the one or more achievement data structures comprises obtaining the class identifier of each entry and wherein displaying the award information comprises categorizing the display of the award information based on the obtained class identifiers.

6. The communications platform of claim 5, wherein the number of data structures further includes a classes data structure which stores entries defining classes participating in a recognition and rewards program; and
   wherein the API processor is further configured to employ the obtained class identifiers to query the class data structure to obtain identifiers of teachers of the classes, and wherein displaying the award information comprises categorizing the display of the award information based on the obtained teacher identifiers.

7. The communications platform of claim 1, wherein the one or more achievement data structures comprise a plurality of achievement data structures, each achievement data structure storing entries defining a particular type of achievement.

8. The communications platform of claim 1, wherein at least some of the received communications each comprise a confirmation that the particular student has completed a challenge with which the achievement is associated.

9. The communications platform of claim 1, wherein each confirmation is generated in response to a user providing input to a communication sent to one of the at least one communication addresses for the particular student.

10. The communications platform of claim 1, wherein displaying the award information comprises displaying elements that each represent a number of achievements that were awarded in a particular class of the plurality of classes or by a particular teacher, and wherein, in response to one of the elements being selected, the dashboard website and web API is configured to query the one or more achievement data structures to obtain additional award information which identifies one or more of:
   a number of each type of achievement awarded in the particular class or by the particular teacher;
   which students received the achievements; or
   which type of achievements were awarded.

11. The communications platform of claim 1, wherein the one or more databases comprise a multi-tenant database and a number of dedicated customer databases including a dedicated customer database for the particular organization, and wherein querying the one or more achievement data structures comprises querying instances of the one or more achievement data structures that are stored in the dedicated customer database for the particular organization.

12. The communications platform of claim 11, wherein the at least one server also has a database sync process which synchronizes entries in the multi-tenant database that pertain to the particular organization to the dedicated customer database for the particular organization such that the dedicated customer database only stores entries pertaining to the particular organization.

13. A communications platform for enabling the implementation of a recognition and rewards system, the communications platform comprising at least one server having the following components:
   one or more databases that define a number of data structures including:
      a classes data structure which stores a first set of entries each of which defines a group competition such that a plurality of group competitions are defined;
      a student/class data structure which stores a first set of entries each of which defines a particular group competition of the plurality of group competitions to which a particular student of a plurality of students belongs;
      an achievement data structure which stores a first set of entries each of which defines an achievement that has been awarded to a particular student of the plurality of students who belongs to a particular group competition of the plurality of group competitions, the achievement representing a particular group of a plurality of groups within the particular group competition; and a webhook data structure which stores entries each of which defines an association between a particular class identifier and a payload URL of a webhook;

a webhook sender process configured to:
  detect when an entry has been added to the achievement data structure or one or more other achievement data structures, the entry defining that an achievement has been awarded to a particular student of the plurality of students that is in a particular class of a plurality of classes;
  in response to detecting that an entry has been added, employ a class identifier associated with the detected entry to query the webhook data structure for any entry that includes the class identifier; and
  upon identifying an entry in the webhook data structure that includes the class identifier, send a payload that identifies the achievement of the detected entry to the associated payload URL; and a group website that is configured to generate a group competition dashboard based on payloads received from the webhook sender process.

14. The communications platform of claim 13, wherein the classes data structure stores a second set of entries each of which defines a class that is participating in a recognition and rewards program.

15. The communications platform of claim 13, wherein the student/class data structure stores a second set of entries each of which defines a particular class of the plurality of classes to which a particular student of the plurality of students belongs.

16. The communications platform of claim 13, wherein the achievement data structure stores a second set of entries each of which defines a particular achievement that has been awarded to a particular student of the plurality of students in a particular class of the plurality of classes.

17. The communications platform of claim 13, wherein the at least one server also has an API processor which receives webhook creation requests that include at least one identifier of a class and a payload URL and, in response, creates entries in the webhook data structure.

18. The communications platform of claim 13, wherein the at least one server includes a group website for each payload URL defined in the webhook data structure, and wherein each group website includes custom rules for calculating group points based on achievements awarded to students belonging to the corresponding group competition.

* * * * *